US011190560B2

(12) United States Patent
Grossman et al.

(10) Patent No.: US 11,190,560 B2
(45) Date of Patent: Nov. 30, 2021

(54) SHARING COMPUTER APPLICATION ACTIVITIES

(71) Applicant: Autodesk, Inc., San Rafael, CA (US)

(72) Inventors: Tovi Grossman, Toronto (CA); George Fitzmaurice, Toronto (CA); Justin Frank Matejka, Newmarket (CA); Barret Ens, Umanitoba (CA); Fraser Anderson, Camrose (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 15/183,549

(22) Filed: Jun. 15, 2016

(65) Prior Publication Data

US 2017/0034291 A1 Feb. 2, 2017

Related U.S. Application Data

(60) Provisional application No. 62/197,486, filed on Jul. 27, 2015.

(51) Int. Cl.
*H04L 29/06* (2006.01)
*H04L 12/26* (2006.01)
*H04L 29/08* (2006.01)

(52) U.S. Cl.
CPC .......... *H04L 65/403* (2013.01); *H04L 43/045* (2013.01); *H04L 43/06* (2013.01); *H04L 67/22* (2013.01)

(58) Field of Classification Search
CPC ..... H04L 43/045; H04L 43/06; H04L 65/403; H04L 67/22
See application file for complete search history.

(56) References Cited

U.S. PATENT DOCUMENTS 9,715,713 B1 * 7/2017 Humphrey ........... G06Q 50/265
10,740,118 B1    8/2020 Pottjegort et al.
(Continued)

FOREIGN PATENT DOCUMENTS

EP    2741469 A1 *  6/2014  ............ H04L 67/22

OTHER PUBLICATIONS

Ahlström, D., Hasan, K. and Irani, P. 2014. Are you comfortable doing that? acceptance studies of around device gestures in and for public settings. MobileHCI '14, 193-202.
(Continued)

*Primary Examiner* — Thomas J Dailey
(74) *Attorney, Agent, or Firm* — Artegis Law Group, LLP

(57) ABSTRACT

Information regarding application usage on an actor device may be provided through activity notifications and activity reports. An activity notification describing current application activity on an actor device is sent, via wireless connection, to an observer device which displays the activity notification. Activity notifications provide different granularity levels of information based on a received level selection or based on a distance (proximity) between the actor device and the observer device. An activity report representing the history of application usage on an actor device may be displayed on the actor device. For example, the activity report may be triggered to by displayed when the actor device is placed flat. The activity report provides a graphical representation of the application usage on the actor device for a predetermined time period of prior usage. The graphical representation may comprise a plurality of stripes, each stripe representing a particular application or application type.

19 Claims, 14 Drawing Sheets

(56) References Cited

U.S. PATENT DOCUMENTS

| | | | | |
|---|---|---|---|---|
| 2002/0067338 | A1* | 6/2002 | Adan | G06F 3/0481 |
| | | | | 345/156 |
| 2007/0001806 | A1* | 1/2007 | Poll | G06F 9/542 |
| | | | | 340/7.59 |
| 2009/0143056 | A1* | 6/2009 | Tang | H04M 1/7253 |
| | | | | 455/418 |
| 2010/0241507 | A1 | 9/2010 | Quinn et al. | |
| 2013/0080964 | A1 | 3/2013 | Shigeta | |
| 2013/0232451 | A1 | 9/2013 | Chen et al. | |
| 2013/0257357 | A1 | 10/2013 | Morinaga | |
| 2014/0045157 | A1 | 2/2014 | Gross | |
| 2014/0240122 | A1* | 8/2014 | Roberts | A61B 5/0022 |
| | | | | 340/539.11 |
| 2014/0245161 | A1 | 8/2014 | Yuen et al. | |
| 2014/0273923 | A1 | 9/2014 | Papakostas | |
| 2015/0012647 | A1 | 1/2015 | Grelewicz | |
| 2015/0032686 | A1* | 1/2015 | Kuchoor | G06F 17/241 |
| | | | | 707/608 |
| 2015/0077251 | A1* | 3/2015 | Cobb | H04L 12/2825 |
| | | | | 340/541 |
| 2015/0326550 | A1* | 11/2015 | Schropfer | H04L 67/14 |
| | | | | 726/7 |
| 2015/0363089 | A1 | 12/2015 | Rao et al. | |
| 2015/0381825 | A1 | 12/2015 | Cai | |
| 2016/0006861 | A1 | 1/2016 | Hodges et al. | |
| 2016/0357577 | A1 | 12/2016 | Gao et al. | |
| 2020/0302029 | A1 | 9/2020 | Holm et al. | |
| 2021/0011556 | A1 | 1/2021 | Atlas et al. | |
| 2021/0012155 | A1 | 1/2021 | Vu et al. | |

OTHER PUBLICATIONS

Anderson, F., Grossman, T., Wigdor, D. and Fitzmaurice, G. 2015. Supporting Subtlety with Deceptive Devices and Illusory Interactions. CHI'15, 10 pages, in press.

Bailly, G., Müller, J., Rohs, M., Wigdor, D, and Kratz, S. 2012. ShoeSense: a new perspective on gestural interaction and wearable applications. CHI '12, 1239-1248.

Borovoy, R., Martin, F., Resnick, M. and Silverman, B. 1998. GroupWear: nametags that tell about relationships. CHI '98, 329-330.

Clark, H.H. and Brennan, S.E. 1991. Grounding in Communication. In Perspectives on Socially Shared Cognition, Lauren B. Resnick, John M. Levine and Stephanie D. Teasley (eds.). American Psychological Association, Washington, 127-149.

Cowan, L.G., Weibel, N. Griswold, W.G., Pina, L.R. and Hollan, J.D. 2012. Projector phone use: practices and social implications. Personal Ubiquitous Comput. 16, 1 (Jan. 2012), 53-63.

Denning, T., Dehlawi, Z. and Kohno, T. 2014. In situ with bystanders of augmented reality glasses: perspectives on recording and privacy-mediating technologies. CHI '14, 2377-2386.

Dourish, P. and Bellotti, V. 1992. Awareness and coordination in shared workspaces. CSCW '92, 107-114.

Fortmann, J., Moller, H., Heuten, W. and Boll, S. How to present information on wrist-worn point-light displays. NordiCHI '14, 955-958.

Greenberg, S., Boyle, M., and Laberge, J. PDAs and shared public displays: Making personal information public, and public information personal. Personal Technologies, 3, 1-2 (1999), 54-64.

Grubert, J. and Schmalstieg, D. 2013. Playing it real again: a repeated evaluation of magic lens and static peephole interfaces in public space. MobileHCI '13, 99-102.

Gutwin, C. and Greenberg, S. 2002. A descriptive framework of workspace awareness for real-time groupware. CSCW 11, 3 (Nov. 2002), 411-446.

Gutwin, C., Roseman, M. and Greenberg, S. 1996. A usability study of awareness widgets in a shared workspace groupware system. CSCW '96, 258-267.

Harrison, C., Horstman, J., Hsieh, G. and Hudson, S. 2012. Unlocking the expressivity of point lights. CHI '12, 1683-1692.

Hinckley, K. 2003. Synchronous gestures for multiple persons and computers. UIST '03, 149-158.

Hoyle, R., Templeman, R., Armes, S., Anthony, D., Crandall, D. and Kapadia, A. 2014. Privacy behaviors of lifeloggers using wearable cameras. UbiComp '14, 571-582.

Jung, J. and Philipose, M. 2014. Courteous Glass. UbiComp '14 Adjunct Proceedings, 1307-1312.

Kan, V., Fujii, K., Amores, J., Jin, C.L.Z., Maes, P. and Ishii, H. 2015. Social textiles: Social affordances and icebreaking interactions through wearable social messaging. TEI '15, 619-624.

Kanis, M., Winters, N., Agamanolis, S., Gavin, A. and Cullinan, C. 2005. Toward wearable social networking with iBand. CHI '05, 1521-1524.

Kao, H.L. and Schmandt, H.L. 2015 MugShots: A mug display for front and back stage social interaction in the workplace. In TEI '15, 57-60.

Ko, J.C., Chan, L.W. and Hung, Y.P. 2010. Public issues on projected user interface. CHI EA '10, 2873-2882.

Liu, C.M. and Donath, U.S. 2006. Urbanhermes: Social signaling with electronic fashion. CHI '06, 885-888.

Marquardt, N., Ballendat, T., Boring, S., Greenberg, S. and Hinckley, K. 2012. Gradual engagement: Facilitating information exchange between digital devices as a function of proximity. ITS '12, 31-40.

Marquardt, N., Hinckley, K. and Greenberg, S. 2012. Cross-device interaction via micro-mobility and F-formations. UIST'12, 13-22.

Monk, A. 2003. Common ground in electronically mediated communication: Clark's theory of language use. HCI Models, Theories, and Frameworks. J.M. Carrol (ed.). Kaufmann, San Francisco, 265-290.

Monk, A., Carroll, J., Parker, S. and Blythe, M. 2004. Why are mobile phones annoying? Behaviour & Information Technology, 23, 1 (Jan. 2004), 33-41.

Monk, A., Fellas, E. and Ley, E. 2004. Hearing only one side of normal and mobile phone conversations, Behaviour & Information Technology, 23, 5, 301-305.

Montero, C.S., Alexander, J., Marshall, M.T. and Subramanian, S. 2010. Would you do that? Understanding social acceptance of gestural interfaces. MobileHCI '10, 275-278.

Morris, M.R., Huang, A., Paepcke, A. and Winograd, T. 2006. Cooperative gestures: multi-user gestural interactions for co-located groupware. CHI '06, 1201-1210.

Morris, M.R., Lombardo, J. and Wigdor, D. 2010. WeSearch: Supporting collaborative search and sensemaking on a tabletop display. CSCW '10, 401-410.

Pearson, J., Robinson, S. and Jones, M. 2015. It's about time: Smartwatches as public displays. CHI '15, 10 pages, in press.

Portnoff, R.S., Lee, L.N., Egelman, S., Mishra, P., Leung, D. and Wagner, D. 2015. Somebody's Watching Me? Assessing the Effectiveness of Webcam Indicator Lights. CHI '15, 2015.

Reeves, S., Benford, S., O'Malley, C. and Fraser, M. 2005. Designing the spectator experience. CHI '05, 741-750.

Rico, J. and Brewster, S. 2010. Usable gestures for mobile interfaces: Evaluating social acceptability. CHI '10, 887-896.

Reetz, A. and Gutwin, C. 2014. Making big gestures: Effects of gesture size on observability and identification for co-located group awareness. CHI '14, 4087-4096.

Roesner, F., Molnar, D., Moshchuk, A., Kohno, T. and Wang, H. 2014. World-driven access control for continuous sensing. CCS '14, 1169-1181.

Serrano, M., Ens, B. and Irani, p. 2014. Exploring the use of hand-to-face input for interacting with head-worn displays. CHI'14, 3181-3190.

Wang, L. and Mueller, K. 2004. Generating subresolution detail in images and volumes using constrained texture synthesis. VIS '04, 75-82.

Non-Final Office Action for U.S. Appl. No. 15/183,602, dated Feb. 14, 2018, 18 pages.

Final Rejection received for U.S. Appl. No. 15/183,602, dated Sep. 18, 2018, 35 pages.

Non-Final Rejection received for U.S. Appl. No. 15/183,602, dated Apr. 18, 2019, 29 pages.

Final Rejection received for U.S. Appl. No. 15/183,602, dated Nov. 6, 2019, 35 pages.

(56) References Cited

OTHER PUBLICATIONS

Non-Final Office Action received for U.S. Appl. No. 15/183,602, dated Apr. 29, 2020, 28 pages.
Final Office Action for U.S. Appl. No. 15/183,602; dated Oct. 26, 2020; 31 pages.
Non-Final Office Action for U.S. Appl. No. 15/183,602; dated Feb. 10, 2021; 28 pages.
Final Rejection received for U.S. Appl. No. 15/183,602 dated Jun. 15, 2021, 44 pages.
Notice of Allowance and Fees Due received for U.S. Appl. No. 15/183,602, dated Oct. 1, 2021, 10 pages.

* cited by examiner

| Granularity Level Selection | Sets of Activities |
|---|---|
| None | No |
| Minimal | photo_taken; video_capture_started; video_captured_stopped... |
| Low | application_opened; application_closed... |
| Moderate | webpage_opened; search_query_performed; weblink_opened... |
| Full | scroll_up; scroll_down; select_text; edit_text; game_score... |

Figure 3

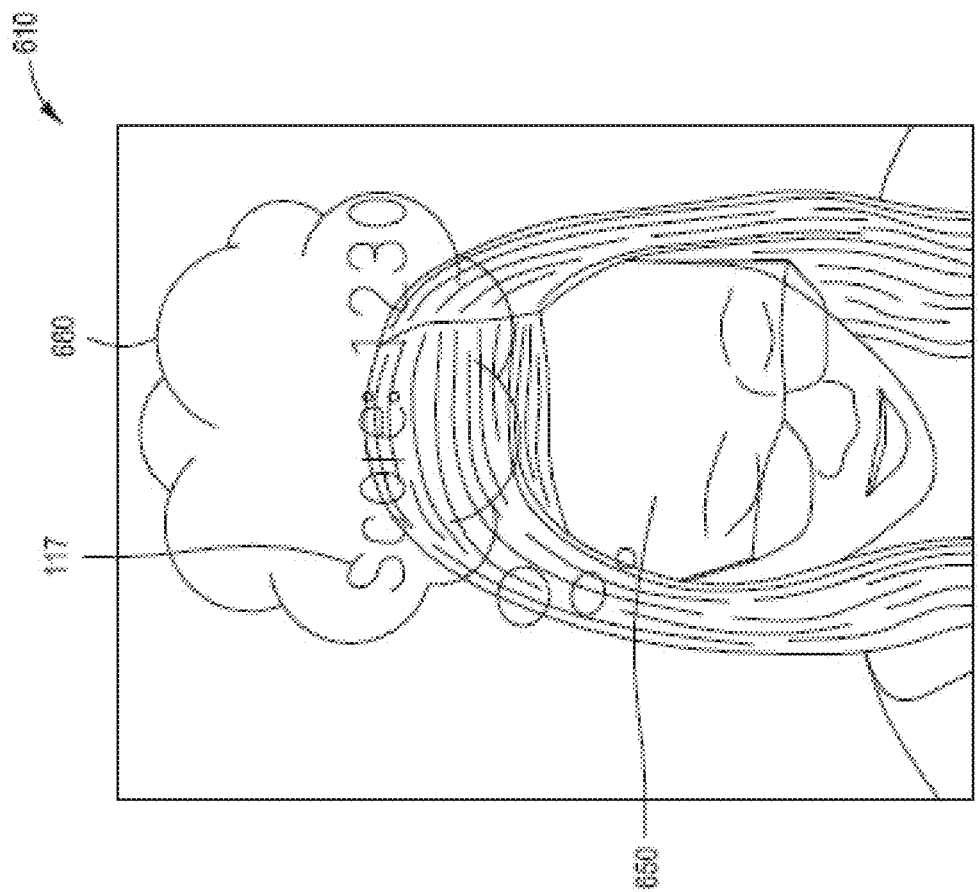
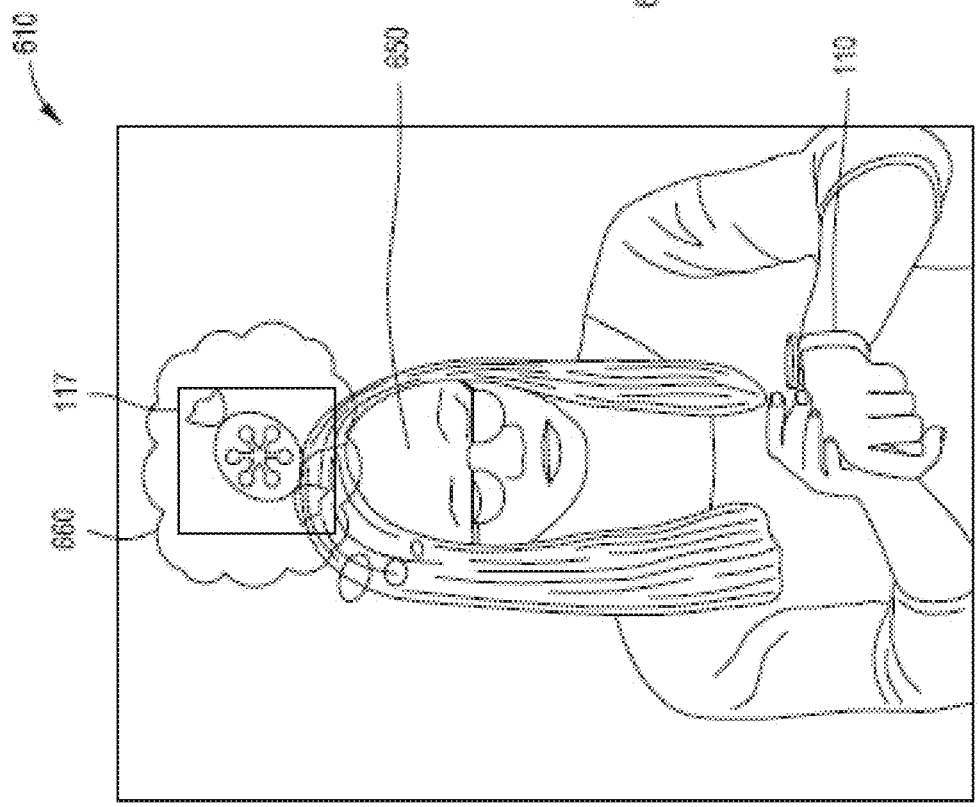

| Proximity Levels | Sets of Activities |
|---|---|
| Distance > 10ft | No |
| 10ft ≥ Distance > 7ft | photo_taken; video_capture_started; video_captured_stopped... |
| 7ft ≥ Distance > 4ft | application_opened; application_closed... |
| 4ft ≥ Distance > 2ft | webpage_opened; search_query_performed; weblink_opened... |
| 2ft ≥ Distance | scroll_up; scroll_down; select_text; edit_text; game_score... |

Figure 7

| Application Type | Sets of Applications |
|---|---|
| Office | OfficeApp1, OfficeApp2, OfficeApp3... |
| Presentation | PresentationApp1, PresentationApp2, PresentationApp3... |
| Multimedia | MultimediaApp1, MultimediaApp2, MultimediaApp3... |
| Game | GameApp1, GameApp2, GameApp3... |

Figure 11

SHARING COMPUTER APPLICATION ACTIVITIES

CROSS-REFERENCE TO RELATED APPLICATIONS

Field of the Invention

This application claims the benefit of U.S. provisional patent application 62/197,486, filed on Jul. 27, 2015. The subject matter of this related application is hereby incorporated herein by reference.

BACKGROUND OF THE INVENTION

Field of the Invention

The present invention generally relates to computer science and, more specifically, to sharing computer application activities.

Description of the Related Art

The rising prevalence of mobile devices is now reflected by the introduction of wearable devices such as smartwatches and smartglasses. However, the social implications and acceptance of using such devices in real-world environments differ when compared to how people respond when traditional computing devices, such as tablets and laptops, on which observers can more easily perceive the user's activities.

As computing devices continue to emerge in smaller and more personal form factors, device usage will continue to encroach on interpersonal interactions. For example, in a work-place environment, such as a meeting in a conference room, it is very difficult to determine what a user is doing on his/her mobile or wearable device during the meeting. Thus, it is difficult to determine whether the user is interacting with work-related applications (e.g., text editor, spreadsheet application, etc.) that are relevant to the meeting or, instead, interacting with entertainment applications (e.g., games, videos, etc.) that are irrelevant to the meeting and serve as distractions. Even in public or social environments, the use of mobile or wearable device can have mixed acceptance, for example, when people around the user of the mobile or wearable device are uncertain whether the mobile or wearable device is currently taking pictures or capturing audio or video of the surrounding group. In sum, because ascertaining what people are doing with their mobile or wearable devices is difficult, especially in settings requiring closer personal interactions, social and workplace acceptance of mobile or wearable devices has been hindered.

As the foregoing illustrates, there is a need in the art for techniques that allow user activities on mobile or wearable computing devices to be more transparent to persons in the vicinity of the user.

SUMMARY OF THE INVENTION

Various embodiments include a computer-implemented method for communicating information related to computing device activity. The computer-implemented method includes detecting a user activity associated with an application executing on an actor device. The computer-implemented method further includes producing an activity notification that includes information related to the user activity and transmitting the activity notification to an observer device for display.

At least one advantage of the disclosed technique is that it provides real-time information regarding application activities of an actor device to surrounding observer devices.

Various embodiments include a computer-implemented method for displaying a report of one or more activities being performed on actor device. The computer-implemented method includes detecting a report trigger and producing an activity report that graphically represents times of use for one or more applications installed on the actor device. The computer-implemented method further includes displaying the activity report on a display associated with the actor device.

At least one advantage of the disclosed technique is that it provides information regarding history of application usage on an actor device to surrounding observers.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a conceptual diagram of a selection levels table implemented in the activity notification environment of FIG. 1, according to various embodiments of the present invention;

FIGS. 6A and 6B illustrate further examples of different activity notifications that can be implemented in the activity notification environment of FIG. 5, according to various other embodiments of the present invention;

FIG. 7 is a conceptual diagram of a proximity levels table implemented in the activity notification environment of FIG. 5, according to various embodiments of the present invention;

FIG. 11 is a conceptual diagram of an application table implemented by the actor device of FIG. 9, according to various embodiments of the present invention;

DETAILED DESCRIPTION

Figure 1:
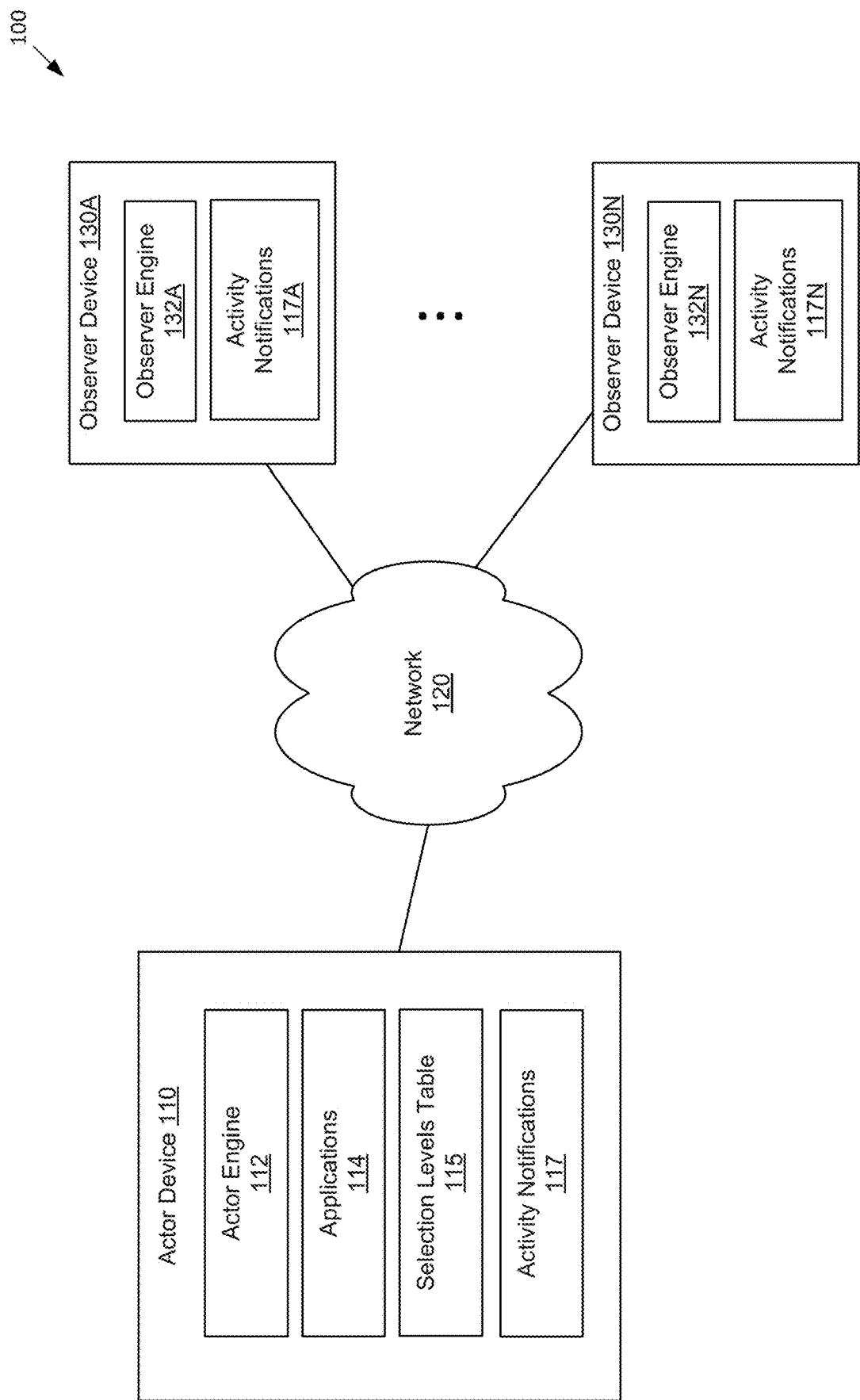
FIG. 1 illustrates an activity notification environment configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into three sections. Section I describes systems and methods for producing activity notifications for displaying on observer devices. Section II describes systems and methods for producing activity reports for displaying on actor devices. Section III describes various alternative embodiments for sharing computer activities.

Embodiments described herein are directed towards a type of computing called candid interaction, where computing devices provide feedthrough about a user's interactions with application to those around the user. Feedthrough may be in the form of activity notifications or activity reports that provide transparency as to a user's activity on a computing device, especially when that computing device is difficult to observe (such as a mobile or wearable device). For example, a user wearing smartglasses can make an observer aware, via an activity notification sent to the observer's device, that the user is are taking notes, as opposed to checking email during a conversation. As another example, a meeting participant can let others know, via an activity report displayed on their device, that they are not distracted by games or videos on their smartphone, but instead are interacting with work-related applications. In some embodiments, activity reports may display the history of application usage on the actor device. Revealing the nature of our device usage to those in our surroundings may help to make usage of mobile or wearable computing devices more socially acceptable and the sharing of usage information can potentially dissolve discomfort about using devices around others.

Section I

Activity Notifications for Displaying on Observer Devices

Information regarding application usage on a device may be provided through activity notifications. An activity notification describing application activity on an actor device may be sent, via a wireless connection, to an observer device which displays the activity notification. In some embodiments, activity notifications are sent to observer devices in real-time to reflect current application usage of the actor device. As used herein, the user of the actor device is referred to as an actor and the user of an observer device is referred to as an observer. Activity notifications may be configured to provide different granularity levels of information detail regarding the application activities on the actor device. For example, activity notifications may be configured to only provide a low level of detail (such as the opening and closing of applications) or a higher level of details (such as specific functions that are being performed on the applications, e.g., sending an email, opening a webpage, etc.).

In some embodiments, the activity notifications provide a level of information detail (referred to herein as level of activity detail) based on a granularity level selection received from the actor using the actor device. In these embodiments, the actor explicitly selects the level of information to be shared with observer devices around the actor. In other embodiments, the activity notifications provide a level of activity detail based on a physical distance (proximity) between the actor/actor device and the observer/observer device. For example, a low level of activity detail may be provided in the activity notifications at a far distance and a higher level of activity detail may be provided in the activity notifications at a closer distance.

Activity Notifications Based on Granularity Level Selection

FIG. 1 illustrates an activity notification environment 100 configured to implement one or more aspects of the present invention. The activity notification environment 100 enables activity notifications based on a granularity level selection received from an actor/user. As shown, the environment 100 includes an actor device 110 and at least one observer device 130 (e.g., 130A-130N) coupled via a network 120. The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The actor device 110 and the observer device 130 may each comprise a mobile or wearable computing device, such as a smartphone, smartwatch, smartglasses, laptop, tablet, and the like. In general, however, the actor device 110 and the observer device 130 may each comprise any computing device configured to perform the embodiments described herein. Each actor device 110 and observer device 130 comprise computer hardware components such as memory for storing software application(s) and data and processors that execute the software application(s) to provide processing engines that enable the operations and functions described herein. The computer hardware components of the actor device 110 and observer device 130 are discussed below in relation to FIGS. 13-14. In this regard, the actor device 110 hosts and executes an actor engine 112 and each observer device 130 hosts and executes an observer engine 132.

The actor device 110 executes an actor engine 112 and one or more software applications 114 and stores a table of level selections (selection levels table 115). For example, the actor engine 112 may be implemented as a suite of plugins to a set of existing software applications, each plugin communicating with a "master" actor engine that receives the data from each plugin and performs the embodiments described herein. As another example, the actor engine 112 may be implemented as a single master engine with an exposed, public application programming interface (API) that other existing software applications share data with by pushing data to the actor engine 112, whereby each software application is responsible for sharing/pushing their data to the actor engine 112. The one or more software applications 114 may comprise common mobile applications, such as a camera or video capture application, web browser application, a social network application, a text editor, an email application, a game application, a multimedia application. Each software application 114 may be associated with a unique graphic icon and/or color that represents the software application 114. In general, the actor engine 112 monitors and detects user activities of the software applications 114, produces activity notifications 117 representing the detected application activities (e.g., through text and/or images), and transmits the activity notifications 117 to one or more observer devices 130 via the network 120.

Each observer device 130 executes an observer engine 132 that receives the activity notifications 117 from the actor engine 112 via the network 120. The observer engine 132 then displays the received activity notifications 117 on a display of the observer device 130. For example, the observer engine 132 may be implemented as a background service configured to receive inbound connections that provide data from an actor device 110/actor engine 112. On receiving this data, the background service may be configured to generate and display activity notifications 117. As another example, the observer engine 132 may be implemented as a foreground process configured to actively poll or request data from an actor device 110/actor engine 112 to ascertain whether or not any new data or information is provided by the actor device 110/actor engine 112.

Figure 2B:
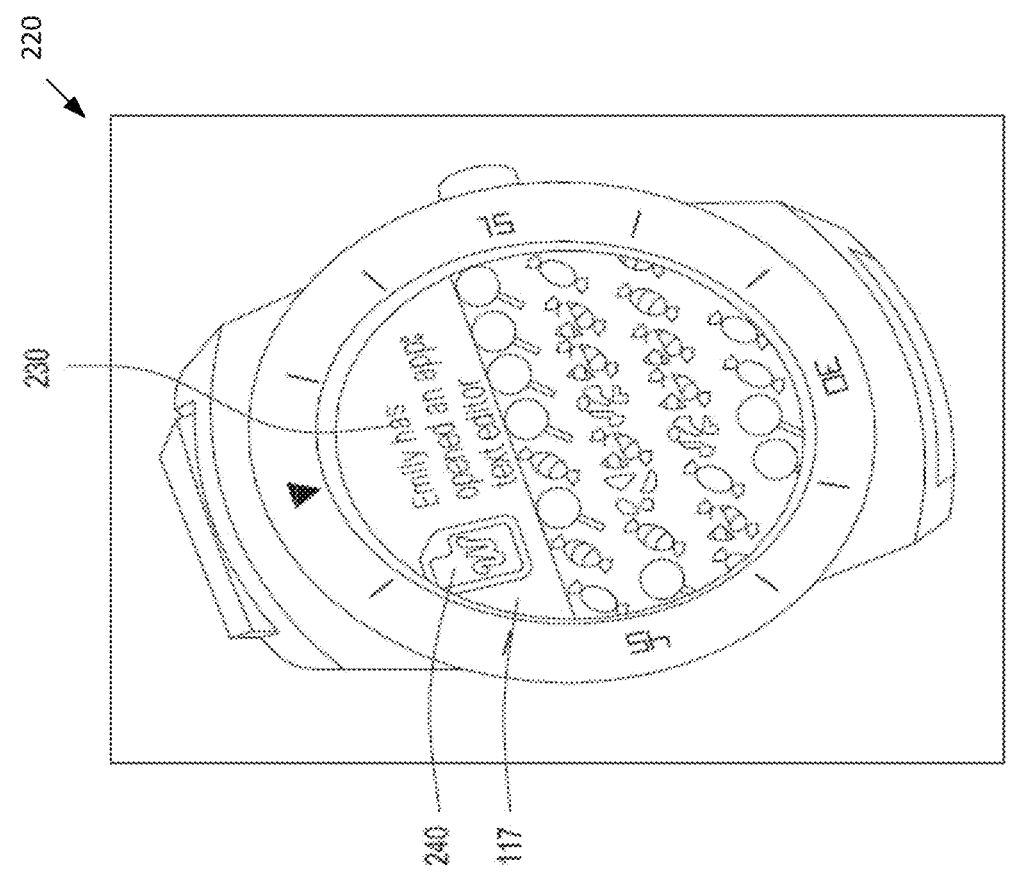
FIGS. 2A and 2B illustrate examples of different activity notifications that can be implemented in the activity notification environment of FIG. 1, according to various embodiments of the present invention.
Figure 2A:
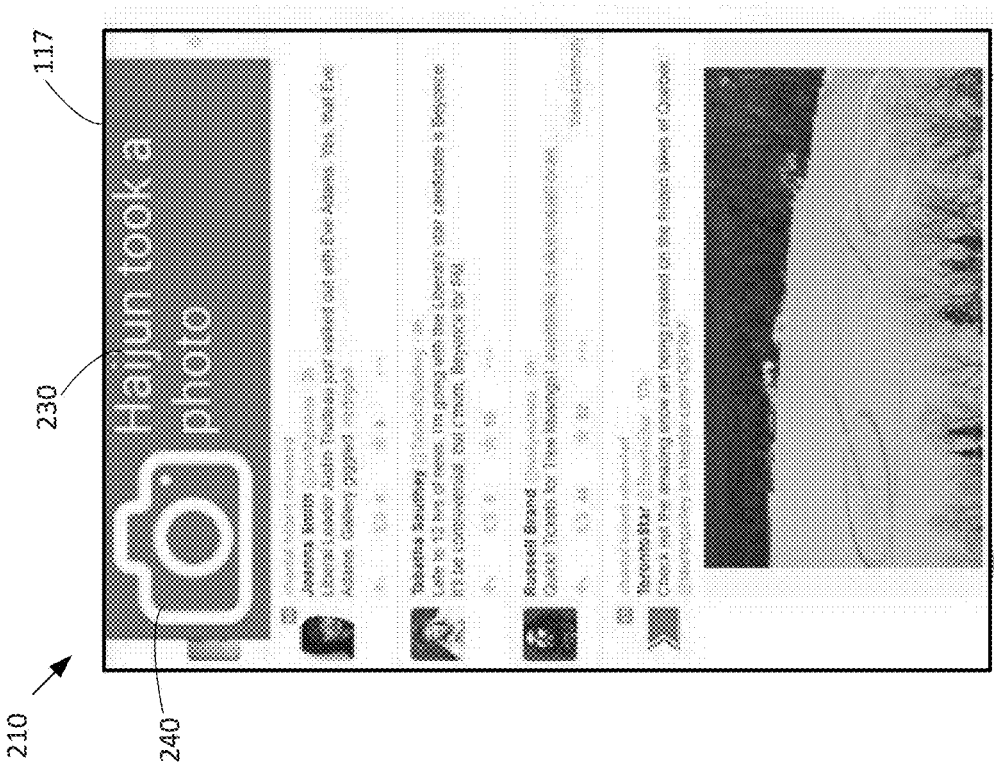

FIGS. 2A and 2B illustrate examples of different activity notifications that can be implemented in the activity notification environment of FIG. 1, according to various embodiments of the present invention. FIG. 2A shows an activity notification 117 that is received and displayed on a display 210 of an observer device 130 comprising a smartphone. FIG. 2B shows an activity notification 117 that is received and displayed on a display 220 of an observer device 130 comprising a smartwatch. In some embodiments, an activity notification 117 is displayed as an overlay that is displayed over (on top of) any currently displayed applications on the observer device 130.

As shown in FIGS. 2A-B, an activity notification 117 may comprise text data 230 and image data 240. The text data 230 may describe the application activity on the actor device 110. For example, the text data 230 may specify the name of the actor using the actor device 110 (e.g., Haijun, Emily, etc.), an application activity performed by the actor (e.g., taking a photo, opening an application, etc.), and/or the name of the application (or application type) with which the actor is interacting (e.g., photo application, text editor application, etc.). The image data 240 may include a unique icon and/or color associated with/representing the application with which the actor is interacting. In other embodiments, an activity notification 117 may further comprise at least one interactive item (such as a hyperlink or interactive webpage) that is selectable by the observer at the observer device 130. In further embodiments, an activity notification 117 may other forms of data, such as animation, audio, and/or video data that is played back at the observer device 130.

In some embodiments, the activity notifications 117 provide a level of activity detail based on a granularity level selection received from the user/actor using the actor device 110. In these embodiments, the received level selection indicates a granularity level of activities (a predefined set of application activities) that is to be shared with nearby observer devices 130. Mappings between a plurality of different level selections and sets of corresponding application activities are stored in the selection levels table 115.

FIG. 3 is a conceptual diagram of a selection levels table 115 implemented in the activity notification environment 100 of FIG. 1, according to various embodiments. The selection levels table 115 comprises a plurality of entries 301 (such as 301a, 301b, etc.), each entry 301 representing a granularity level selection 310 that corresponds to a set of application activities 320.

The granularity level selections 310 may vary from a low level of activity detail (e.g., None 301a) to a high level of activity detail (e.g., Full 301e), where the number of application activities that may be included in an activity notification 117 accumulatively increase from the low level to the high level of activity detail. In some embodiments, a particular granularity level selection 310 maps to the set of application activities 320 corresponding to the granularity level selection 310 as well as each set of application activities 320 corresponding to all granularity level selections 310 at a lower level than the particular granularity level selection 310. For example, the Moderate level selection 301d maps to the set of application activities 320 (e.g., webpage_opened; search_query_performed; weblink_opened) corresponding to the Moderate level selection 301d, the set of application activities 320 (e.g., application_opened; application_closed) corresponding to the Low level selection 301c, and the set of application activities 320 (e.g., photo_taken; video_capture_started; video_captured_stopped) corresponding to the Minimal level selection 301b. Thus, the higher the granularity level selection 310, the more application activities of the actor device 110 that are shared via the activity notifications 117.

The actor engine 112 may receive a selection of a granularity level from the user/actor of the actor device 110. Therefore, the actor may explicitly control the level of information to be shared with observer devices nearby the actor. For example, the actor engine 112 may display a sharing slider on a display of the actor device 110, the sharing slider comprising an interactive slider for selecting the granularity level. In other embodiments, the actor engine 112 may receive the user selection of the granularity level using another interactive mechanism. As described above, the received granularity level selection maps to a set of application activities that may be included in the activity notifications 117. In these embodiments, the actor engine 112 may detect an application activity and produce and transmit an activity notification 117 representing the application activity only if the detected application activity satisfies the granularity level selection. The detected application activity may be determined to satisfy the granularity level selection when the detected application activity is included in the mapped set of application activities.

Figure 4:
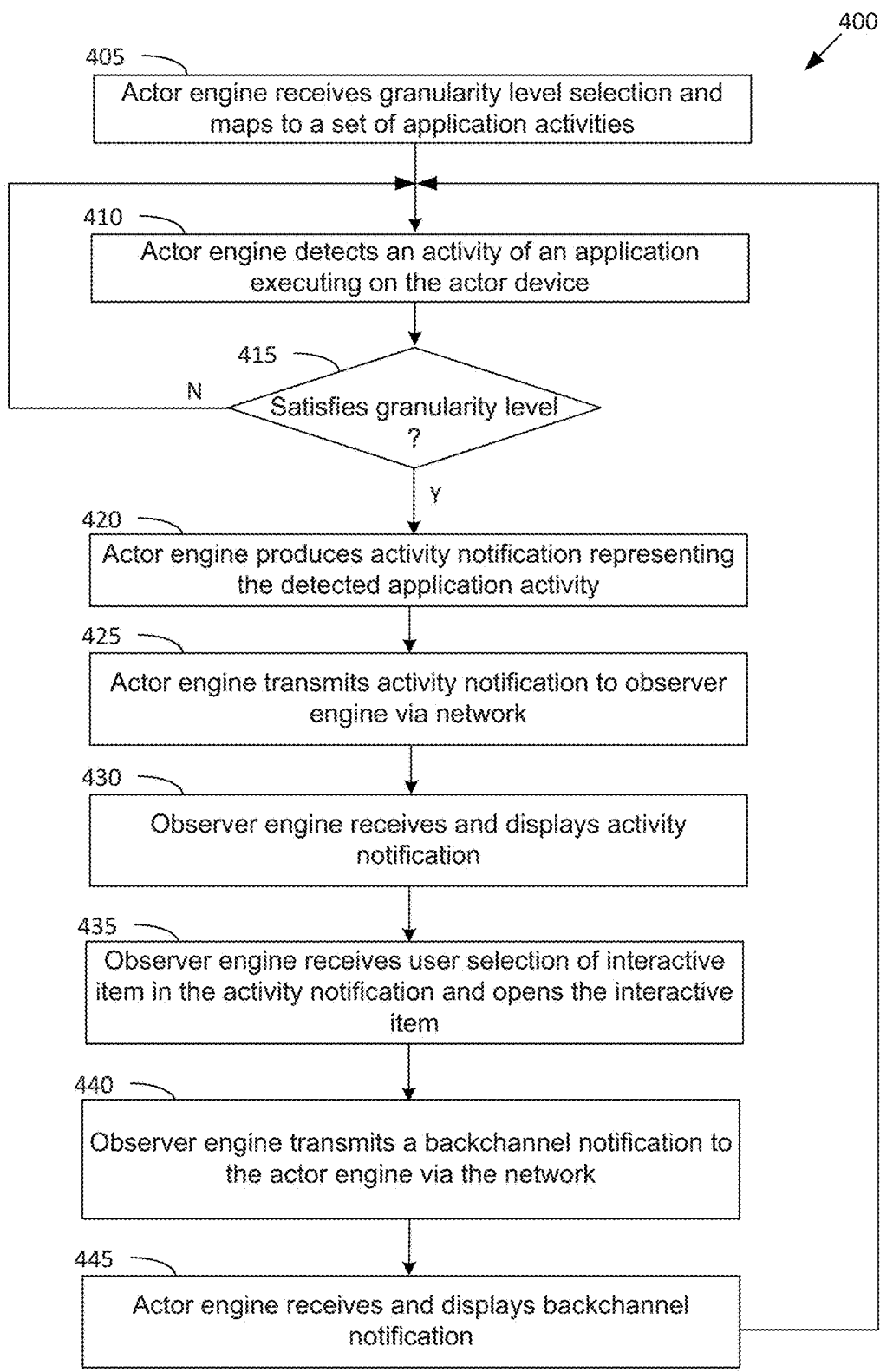
FIG. 4 illustrates a flow diagram of method steps for producing and displaying activity notifications in an activity notification environment, according to various embodiments of the present invention.

FIG. 4 illustrates a flow diagram of method steps for producing and displaying activity notifications in an activity notification environment, according to various embodiments of the present invention. Although the method steps are described in conjunction with the systems of FIGS. 1-3, persons skilled in the art will understand that any system configured to perform the method steps, in any order, is within the scope of the invention. In some embodiments, the method 400 may be performed by the actor engine 112 executing on the actor device 110 and at least one observer engine 132 executing on at least one observer device 130.

The method 400 begins when the actor engine 112 receives (at step 405) a user selection of a granularity level for the activity notifications 117. For example, the actor engine 112 may receive the granularity level selection through an interactive sharing slider displayed on the actor device 110. The actor engine 112 also maps (at step 405) the received granularity level selection to a set of application activities that satisfy the received granularity level selection using the selection levels table 115.

The actor engine 112 then detects (at step 410) an activity of an application 114 executing on the actor device 110. The detected application activity may comprise a specific user interaction with the application 114 (e.g., opening or closing the application, sending an email, taking a picture, begin capturing video, etc.). For example, application activities may be detected by the actor engine 112 through a pre-defined API. Applications wishing to share information with observer devices can explicitly inform the actor engine 112 via direct calls to the pre-defined API. As another example, the actor engine 112 may infer application activities by deciphering the running code or messages sent over a network by intercepting network packets and analyzing the network packets for known patterns.

The actor engine 112 then determines (at step 415) whether the detected application activity satisfies the received granularity level selection (for example, by determining whether the detected application activity is included in the mapped set of application activities). If not, the method 400 continues at step 410 where the actor engine 112 detects another activity of an application 114 executing on the actor device 110.

If the actor engine 112 determines (at step 415—Yes) that the detected application activity satisfies the received granularity level selection, the actor engine 112 produces (at step 420) an activity notification 117 representing the detected application activity. For example, the activity notification 117 may comprise text data 230 (e.g., specifying the actor name, the detected application activity, and/or the application name or application type), image data 240 (e.g., comprising a unique icon and/or color associated with the application), animation data, audio data, and/or video data. In some embodiments, the activity notification 117 may further comprise at least one interactive item (e.g., a hyperlink or interactive webpage). In an alternative embodiment, the actor engine 112 may generate notification information needed for the observer engine to generate and display the activity notification 117. The notification information may be collected by a centralized service, for example, run on a local PC or server or an Internet-based cloud architecture, whereby actor engines 112 push notification information to the centralized service and the centralized service identifies observer devices to receive the notification information based on the location, context, and/or granularity settings of the observer devices.

The actor engine 112 then transmits (at step 425) the activity notification 117 to at least one observer engine 132 via the network 120 (e.g., Wifi or Bluetooth). The observer engine 132 then receives and displays (at step 430) the activity notification 117 on a display of the observer device 130. In some embodiments, the observer engine 132 displays the activity notification 117 as an overlay displayed over (on top of) any currently displayed applications on the observer device 130. The observer engine 132 may display the activity notification 117 for a predetermined period of time before removing the activity notification 117 from the display of the observer device 130. In these embodiments, the activity notification 117 may be displayed in the form of a short-lived pop-up message.

The below steps 435-445 comprise optional steps that may be performed if the activity notification 117 comprises at least one interactive item. At step 435, the observer engine 132 receives a user selection of the at least one interactive item and activates/opens at least one interactive item. For example, the observer engine 132 may receive a user selection of an interactive item comprising a weblink to a corresponding webpage that is displayed by opening a web browser application on the observer device 130. The observer engine 132 then transmits (at step 440) a backchannel notification to the actor engine 112 via the network 120. The backchannel notification may indicate that the at least one interactive item was selected at the observer device 130. The actor engine 112 then receives and displays (at step 445) the backchannel notification on a display of the actor device 110. The method 400 continues at step 410 where the actor engine 112 detects another activity of an application 114 executing on the actor device 110.

Activity Notifications Based on Proximity Level

In some embodiments, the activity notifications provide a level of activity detail based on a physical distance (proximity) between the actor/actor device and the observer/observer device. For example, a low level of activity detail (fewer application activities) may be provided in the activity notifications at a far distance and a higher level of activity detail (more application activities) may be provided in the activity notifications at a closer distance.

Figure 5:
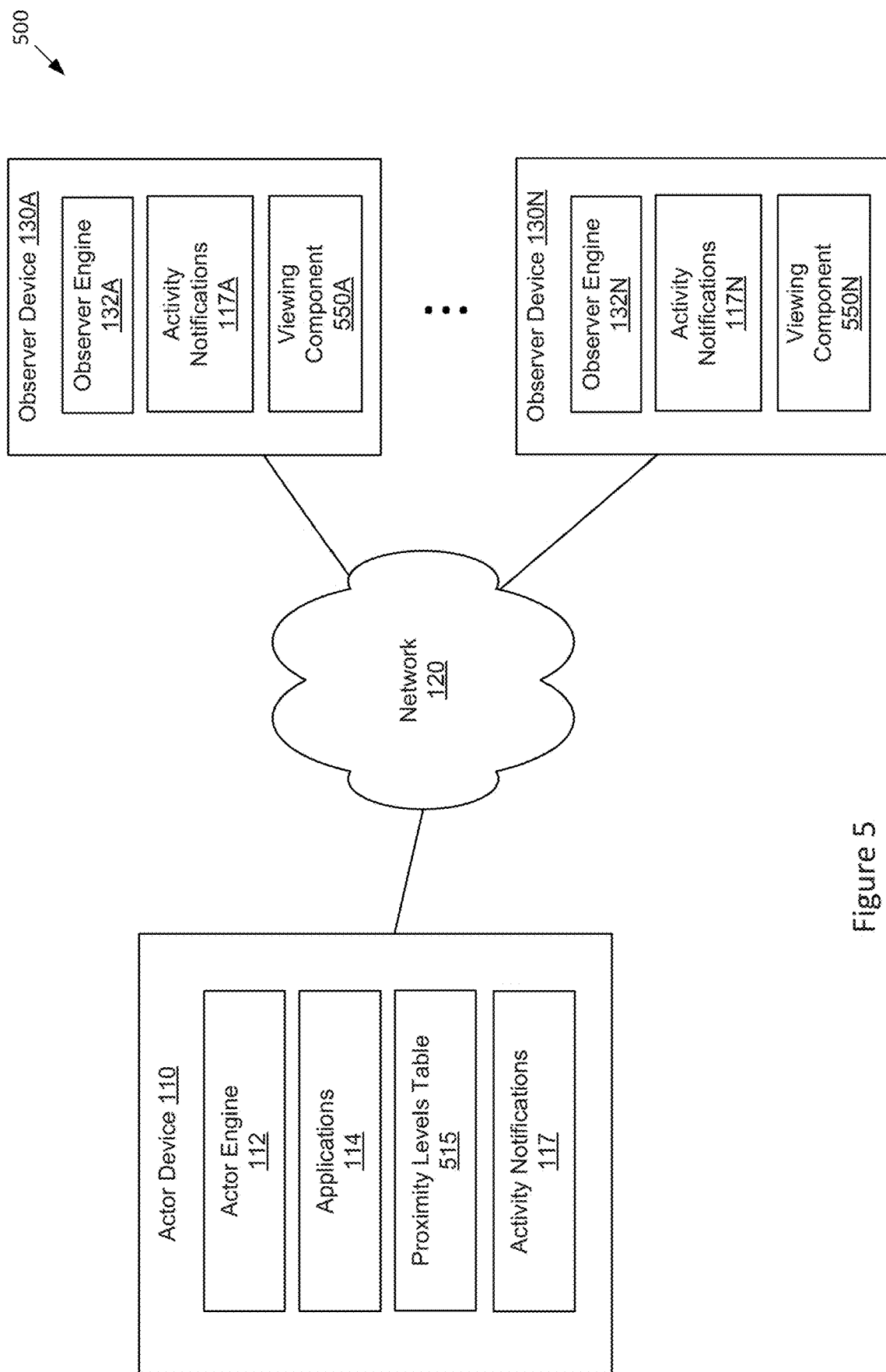
FIG. 5 illustrates an activity notification environment configured to implement one or more other aspects of the present invention.

FIG. 5 illustrates an activity notification environment 500 configured to implement one or more aspects of the present invention. The activity notification environment 500 enables activity notifications based on a proximity level determined from on a distance between the actor/actor device 110 and the observer/observer device 130. The activity notification environment 500 comprises some components that correspond to components of the activity notification environment 100 shown in FIG. 1 and are not discussed in detail here. The components and features of the activity notification environment 500 that are different from the components and features described in relation to the activity notification environment 100 of FIG. 1 are discussed below.

As shown, the environment 500 includes an actor device 110 and at least one observer device 130 (e.g., 130A-130N) coupled via a network 120. In general, the actor device 110 and the observer device 130 may each comprise any computing device configured to perform the embodiments described herein, such as a smartphone, smartwatch, smartglasses, laptop, tablet, and the like.

The actor device 110 executes an actor engine 112 and one or more software applications 114 and stores a table of proximity levels (proximity levels table 515). In general, the actor engine 112 monitors and detects user activities of the software applications 114, produces activity notifications 117 representing the detected application activities, and transmits the activity notifications 117 to one or more observer devices 130 via the network 120. The level of activity detail provided in the activity notifications may be based on a distance between the actor/actor device 110 and the observer/observer device 130 and the proximity levels table 515.

Each observer device 130 executes an observer engine 132 that receives and displays activity notifications 117 on a display of the observer device 130. In some embodiments, each observer device 130 comprises a viewing component 550 that enables simultaneous viewing of the actor/user of the actor device 110 and displaying of the activity notifications 117. The viewing component 550 may comprise a combination of hardware components and software components for providing the simultaneous viewing and displaying functions. For example, the observer device 130 may comprise a smartphone having a viewing component 550 comprising camera or video components (e.g., lens and camera/video software) for viewing the actor and a display for displaying the actor and the activity notifications 117. Thus, the observer may point the lens of the smartphone towards the actor and the smartphone may display a viewing of the actor and also display the activity notifications 117 simultaneously. As another example, the observer device 130 may comprise smartglasses, wherein the glass lenses provide the viewing component 550 for viewing the actor and displaying the activity notifications 117. Thus, the observer may look towards the actor and the smartglasses may provide a viewing of the actor and also display the activity notifications 117 simultaneously on the glass lenses.

FIGS. 6A and 6B illustrate further examples of different activity notifications that can be implemented in the activity notification environment of FIG. 5, according to various other embodiments of the present invention. FIG. 6A shows an activity notification 117 that is displayed on a display 610 of an observer device 130 in far proximity to the actor 650/actor device 110. FIG. 6B shows an activity notification 117 that is displayed on a display 610 of an observer device 130 in close proximity to the actor 650/actor device 110. In the examples of FIGS. 6A-B, the actor device 110 comprises smartglasses and the observer device 130 may comprise a smartphone or smartglasses.

As shown in FIGS. 6A-B, an actor 650 (using an actor device 110) is viewed through the observer device 130 which simultaneously displays an activity notification 117. In some embodiments, the viewing component 550 displays an activity notification 117 as an overlay proximate to the view of the actor 650. For example, the activity notification 117 may be displayed within a message bubble 660 displayed next to the face of the actor 650. The level of activity detail in the activity notification 117 may vary depending on the distance between the actor 650/actor device 110 and the observer/observer device 130. For example, FIG. 6A shows an activity notification 117 with a relatively lower level of activity detail (e.g., an icon representing a game application with which the actor is currently interacting) when the actor 650/actor device 110 is relatively farther away from the observer/observer device 130. In comparison, FIG. 6B shows an activity notification 117 with a relatively higher level of activity detail (e.g., a game score of the game application) when the actor 650/actor device 110 in relatively closer to the observer/observer device 130.

In some embodiments, the activity notifications 117 provide a level of activity detail that is determined by the actor device 110 based on a distance between the actor/actor device 110 and the observer/observer device 130 and the proximity levels table 515. In these embodiments, the level of activity detail indicates a granularity level of activities (a predefined set of application activities) that is to be shared with nearby observer devices 130. Mappings between a plurality of different proximity levels and sets of corresponding application activities are stored in the proximity levels table 515.

FIG. 7 is a conceptual diagram of a proximity levels table 515 implemented in the activity notification environment 500 of FIG. 5, according to various embodiments. The proximity levels table 515 comprises a plurality of entries 701 (such as 701a, 701b, etc.), each entry 701 representing a proximity level 710 that corresponds to a set of application activities 720. Each proximity level 710 may correspond to a specific distance range between the actor/actor device 110 and the observer/observer device 130 (e.g., greater than 10 feet, between 7 feet and 10 feet, between 4 feet and 7 feet, etc.).

Each proximity level 710 maps to a level of activity detail and a set of application activities 720 that may be included in the activity notifications 117. Thus, the proximity levels 710 may vary from a low level of activity detail (e.g., far distance 701a) to a high level of activity detail (e.g., close distance 701e), where the number of application activities that may be included in an activity notification 117 accumulatively increase from the low level to the high level of activity detail. In general, a lower proximity level 710 corresponding to a farther distance range maps to a lower level of activity detail and a smaller set of application activities 720 than a higher proximity level 710 corresponding to a closer distance range. Thus, the observer is given implicit control over the level of activity detail, and to access the most detail, the observer is required to enter the actor's personal space. In some embodiments, a particular proximity level 710 maps to the set of application activities 720 corresponding to the proximity level 710 as well as each set of application activities 720 corresponding to all proximity levels 710 at a lower level than the particular proximity level 710. For example, a proximity level 701d ("4 ft>Distance>2 ft") maps to the set of application activities 720 (e.g., webpage_opened; search_query_performed; weblink_opened) corresponding to the proximity level 701d, the set of application activities 720 (e.g., application_opened; application_closed) corresponding to the proximity level 701c ("7 ft>Distance>4 ft"), and the set of application activities 720 (e.g., photo_taken; video_capture_started; video_captured_stopped) corresponding to the proximity level 701b ("10 ft>Distance>7 ft"). Thus, the higher the proximity level 710, the more application activities of the actor device 110 that are shared via the activity notifications 117.

The actor device 110 may receive, via the network 120, a distance value from the observer device 130 indicating an approximate distance between the actor/actor device 110 and the observer/observer device 130. For example, the observer device 130 may send the distance value to the actor device 110 in a backchannel notification transmitted though the network 120. The actor engine 112 may then determine the appropriate level of activity detail by identifying a proximity level 710 corresponding to the received distance value and mapping the identified proximity level 710 to a set of activities 720 that may be included in the activity notifications 117. In these embodiments, the actor engine 112 may detect an application activity and produce and transmit an activity notification 117 representing the application activity only if the detected application activity satisfies the identified proximity level. The detected application activity may be determined to satisfy the proximity level when the detected application activity is included in the mapped set of application activities.

Figure 8:
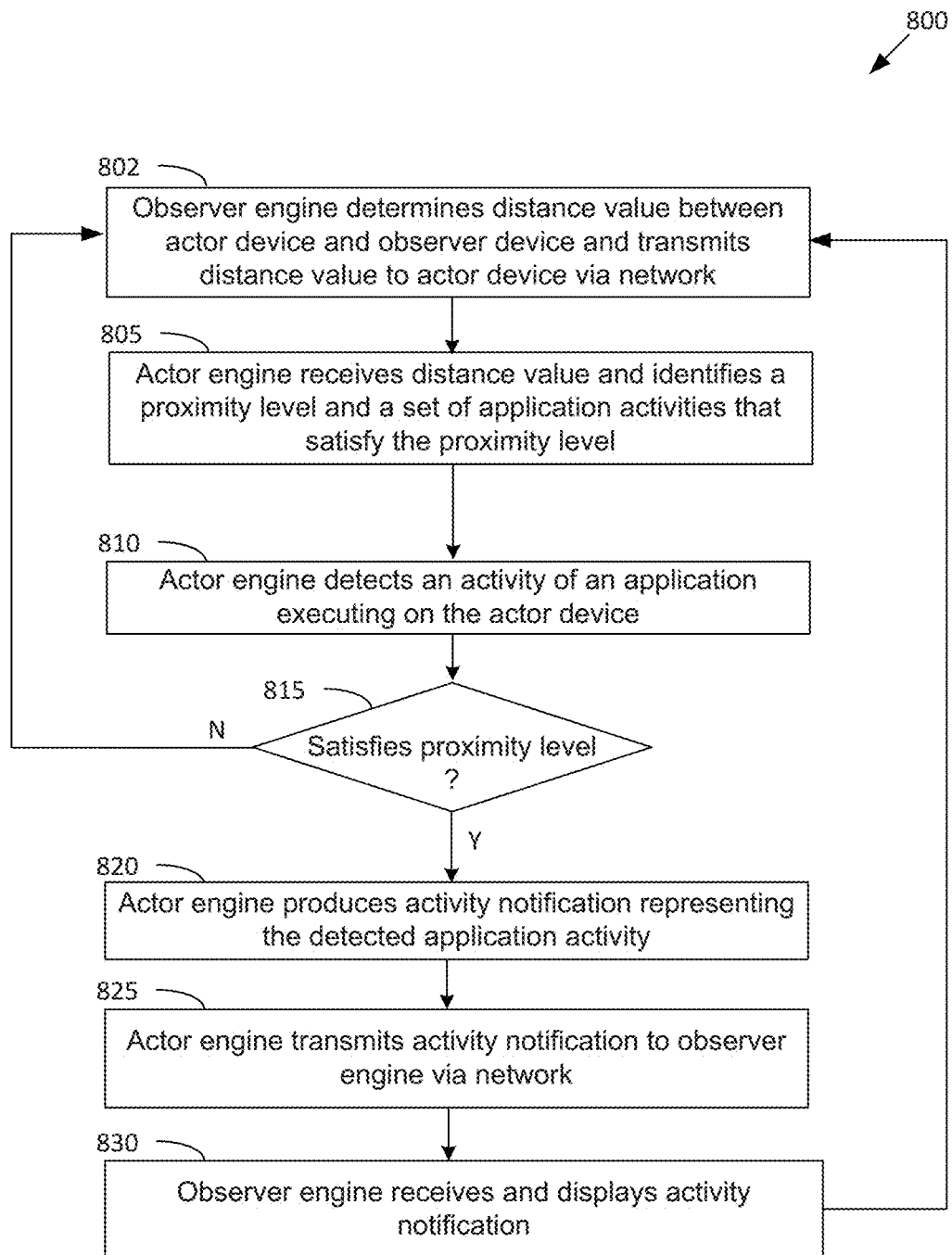
FIG. 8 illustrates a flow diagram of method steps for producing and displaying activity notifications in an activity notification environment, according to various other embodiments of the present invention.

FIG. 8 illustrates a flow diagram of method steps for producing and displaying activity notifications in an activity notification environment, according to various other embodiments of the present invention. Although the method steps are described in conjunction with the systems of FIGS. 1-3 and 5-7, persons skilled in the art will understand that any system configured to perform the method steps, in any order, is within the scope of the invention. In some embodiments, the method 800 may be performed by the actor engine 112 executing on the actor device 110 and at least one observer engine 132 executing on at least one observer device 130. Some steps of the method 800 are similar to steps of the method 400 of FIG. 4 and are not discussed in detail here.

The method 800 begins when the observer engine 132 determines (at step 802) a distance value indicating an approximate distance between the actor/actor device 110 and the observer/observer device 130. The observer may view the actor through a viewing component 550 of the observer device 130 and the observer engine 132 may determine an approximate distance to the actor/actor device 110 using various techniques. For example, the observer engine 132 may detect the actor's face by implementing a face detection library (e.g., Android's face detection library) and the actor's distance may be estimated based on the width of the actor's face. In other embodiments, other techniques may be used to determine the distance value. The observer engine 132 also transmits (at step 802) the distance value to the actor device 110 via the network 120 (e.g., through a backchannel notification).

The actor engine 112 receives (at step 805) the distance value and identifies a proximity level and a set of application activities that satisfy the identified proximity level. For example, the actor engine 112 may identify a proximity level 710 in the proximity levels table 515 corresponding to the received distance value and map the proximity level 710 to a set of application activities that satisfy the proximity level.

The actor engine 112 then detects (at step 810) an activity of an application 118 executing on the actor device 110. The actor engine 112 then determines (at step 815) whether the detected application activity satisfies the identified proximity level (by determining whether the detected application activity is included in the mapped set of application activities). If not, the method 800 continues at step 802. If the actor engine 112 determines (at step 815—Yes) that the detected application activity satisfies the identified proximity level, the actor engine 112 produces (at step 820) an activity notification 117 representing the detected application activity. The actor engine 112 then transmits (at step 825) the activity notification 117 to the observer engine 132 via the network 120.

The observer engine 132 then receives and displays (at step 830) the activity notification 117 on a display of the observer device 130. In some embodiments, the viewing component 550 of the observer engine 132 displays the activity notification 117 as an overlay proximate to the view of the actor (such as within a message bubble 660 displayed next to the face of the actor). The observer engine 132 may display the activity notification 117 for a predetermined period of time before removing the activity notification 117 from the display of the observer device 130. The method 800 continues at step 802.

Section II

Activity Reports for Displaying Application Usage

Information regarding application usage on a device may also be provided through activity reports. An activity report representing the history of application usage/activity on an actor device may be displayed on the actor device. For example, the activity report may be triggered to by displayed on the actor device when the actor device is placed flat on a table, or when it receives a user input to display the activity report. The activity report may provide a graphical representation of the application usage/activity on the actor device for a predetermined time period of prior usage (e.g., the last 10 minutes of application activity). For example, the graphical representation may comprise a plurality of stripes, each stripe representing a particular application or application type. The size of each stripe may represent and correspond to the total amount of time the application or application type was in usage during the predetermined time period. Thus, the user of an actor device may easily convey to others the application usage of the actor device in a transparent and easily understood manner.

Figure 9:
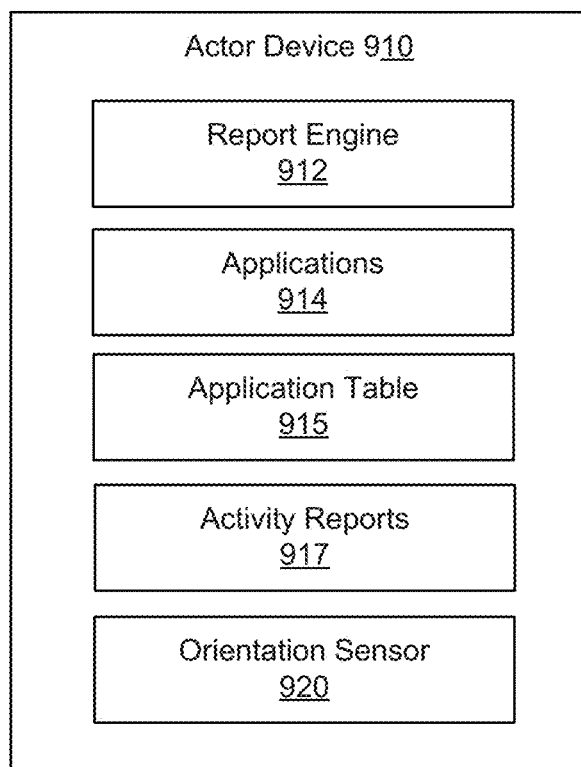
FIG. 9 illustrates an actor device configured to implement one or more aspects of the present invention.

FIG. 9 illustrates an actor device 910 configured to implement one or more aspects of the present invention. The actor device 910 may comprise a mobile or wearable computing device, such as a smartphone, smartwatch, smartglasses, laptop, tablet, and the like. In general, however, the actor device 910 may comprise any computing device configured to perform the embodiments described herein. The actor device 910 comprises computer hardware components such as memory for storing software application(s) and data and processors that execute the software application(s) to provide processing engines that enable the operations and functions described herein. The computer hardware components of the actor device 910 are discussed below in relation to FIG. 13.

The actor device 910 executes a report engine 912 and one or more software applications 914 and stores an application table 915. For example, the report engine 912 may be implemented as a background process which continually monitors which software applications are opened and actively being used (executing) via system calls exposed by an operating system of the actor device 110. As another example, the report engine 912 may be implemented as a process that runs and exposes a public API, whereby software applications or processes are able to connect to and push data to the public API to indicate when the software applications or processes are running or which activity/task is currently being completed. As a further example, the report engine 912 may be implemented as a process which continually captures screen images of the actor device and executes computer vision algorithms to recognize which application is currently active. For example, the one or more software applications 914 may comprise common mobile applications, such as a camera or video capture application, web browser application, a social network application, a text editor, an email application, a game application, a multimedia application. Each software application 914 may be associated with a unique graphic icon and/or color that represents the software application 914. The actor device 910 may also include an orientation sensor device 920, such as an accelerometer or tilt sensor. In general, the report engine 912 monitors usage of the software applications 914 on the actor device 910 and, upon detecting an activity report trigger, produces and displays an activity report 917 that graphically represents the history of application usage on the actor device 910.

Figure 10B:
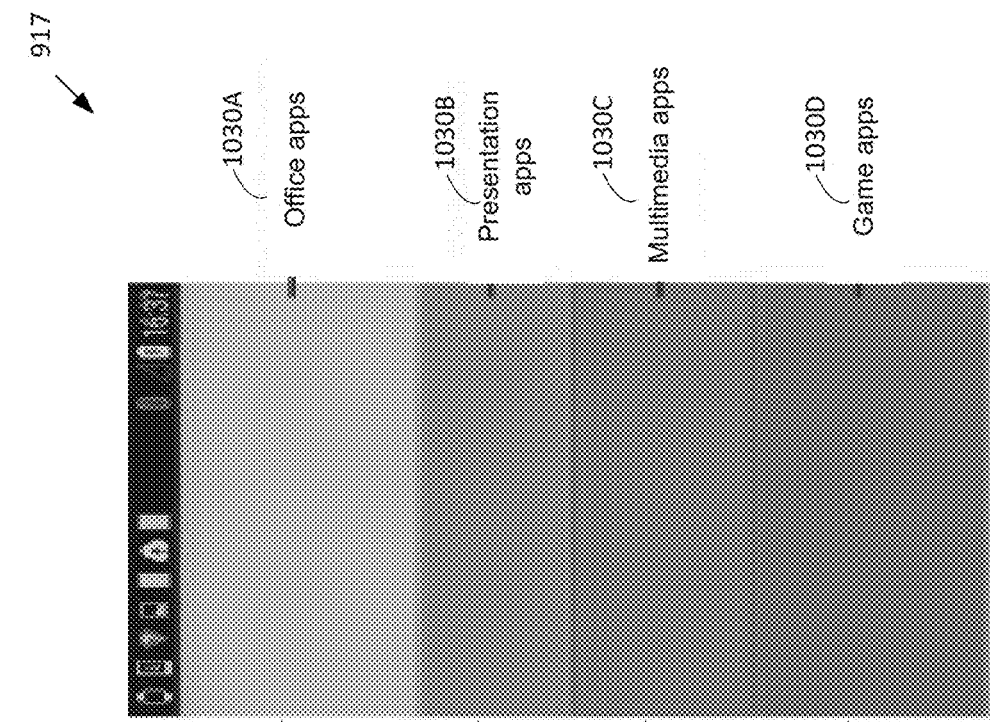
FIGS. 10A and 10B illustrate further examples of different activity reports that can be displayed by the actor device of FIG. 9, according to various embodiments of the present invention.
Figure 10A:
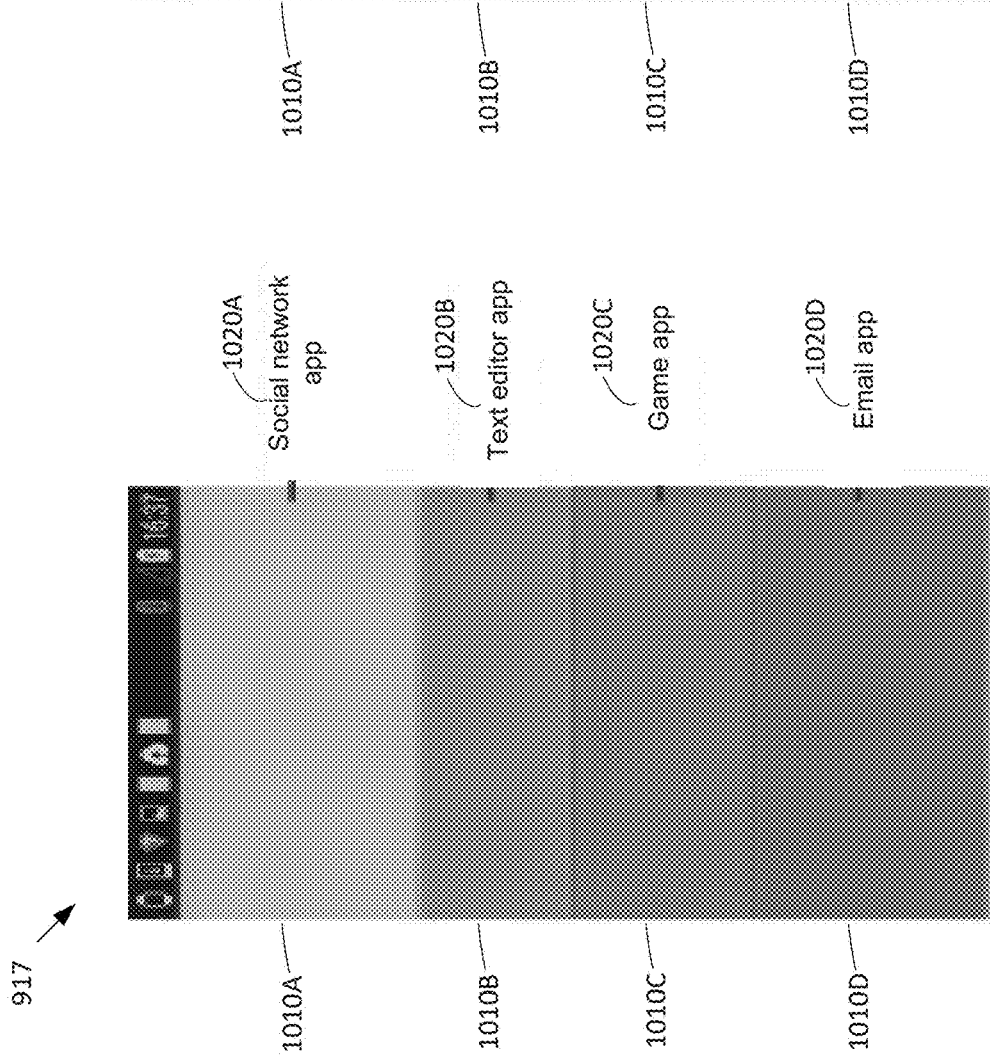

FIGS. 10A and 10B illustrate further examples of different activity reports that can be displayed by the actor device of FIG. 9, according to various embodiments of the present invention. In some embodiments, an activity report 917 is displayed as an overlay that is displayed over (on top of) any currently displayed applications on the actor device 910. An activity report 917 may provide a graphical representation of the application usage/activity on the actor device for a predetermined time period of prior usage (e.g., the last 5 minutes of application activity prior to the report trigger being detected). As shown in FIGS. 10A-B, the graphical representation may comprise a plurality of stripes 1010 (such as stripes 1010a-d), each stripe representing and corresponding to a particular application or application type. Each stripe 1010 may comprise image data comprising a unique icon and/or color associated with the corresponding application or application type. The display size of each stripe 1010 may represent the total amount of time the application or application type was in usage during the predetermined time period. Thus, a first stripe 1010 with a larger display size corresponds to an application or application type having a longer time usage compared to a second stripe 1010 with a smaller display size that corresponds to an application or application type having a shorter time usage over the predetermined time period. For example, the pixel width of each stripe 1010 may be constant, but the pixel height of each stripe 1010 may vary depending on the time usage of the corresponding application or application type.

FIG. 10A shows an activity report 917 that shows a history of usage of the actor device 910 per application. In this embodiment, each stripe 1010 corresponds to a specific application 1020 (such as applications 1020*a-d*). Each stripe 1010 may comprise image data comprising a unique icon and/or color associated with the specific application. The display size of each stripe 1010 may be based on the total amount of time the application was in usage during the predetermined time period. In further embodiments, the activity report 917 may also contain and display text data that specifies an application name for the application 1020 corresponding to each stripe 1010. For example, the application name may be displayed within or near the corresponding stripe 1010. The activity report 917 may also contain and display text data that specifies the predetermined time period of prior usage (e.g., "History of last 5 minutes"). For example, the predetermined time period may be displayed within or near the plurality of stripes 1010.

FIG. 10B shows an activity report 917 that shows a history of usage of the actor device 910 per application type. In this embodiment, each stripe 1010 corresponds to an application type 1030 (such as application types 1030*a-d*). Each application type may be associated with a set of one or more applications (e.g., as specified in an application table 915). The usage time of an application type may be determined by the sum of the usage times of the set of applications associated with the application type. Each stripe 1010 may comprise image data comprising a unique icon and/or color associated with the application type. The display size of each stripe 1010 may be based on the total amount of time that the set of applications associated with the application type were in usage during the predetermined time period. In further embodiments, the activity report 917 may also contain and display text data that specifies the application type 1030 corresponding to each stripe 1010. For example, the application type may be displayed within or near the corresponding stripe 1010. The activity report 917 may also contain and display text data that specifies the predetermined time period of prior usage.

The actor device 910 may store an application table 915 that maps/associates application types to sets of applications. FIG. 11 is a conceptual diagram of an application table 915 implemented in the actor device 910 of FIG. 9, according to various embodiments. The application table 915 comprises a plurality of entries 1101 (such as entries 1101*a-d*), each entry 1101 representing an application type 1110 that is associated with and corresponds to a set of applications 1120. For example, for an "Office" application type 1101*a*, the application table 915 may specify one or more associated applications (e.g., OfficeApp1, OfficeApp2, etc.), for a "Presentation" application type 1101*b*, the application table 915 may specify one or more associated applications (e.g., PresentationApp1, PresentationApp2, etc.), for a "Multimedia" application type 1101*c*, the application table 915 may specify one or more associated applications (e.g., MultimediaApp1, MultimediaApp2, etc.), for a "Game" application type 1101*c*, the application table 915 may specify one or more associated applications (e.g., GameApp1, GameApp2, etc.), and so forth. In other embodiments, each application type may be associated with a set of applications in a different manner, such as through user-defined application groupings and associations (e.g. if the user places 5 applications into a "productivity" folder representing an application type).

Figure 12:
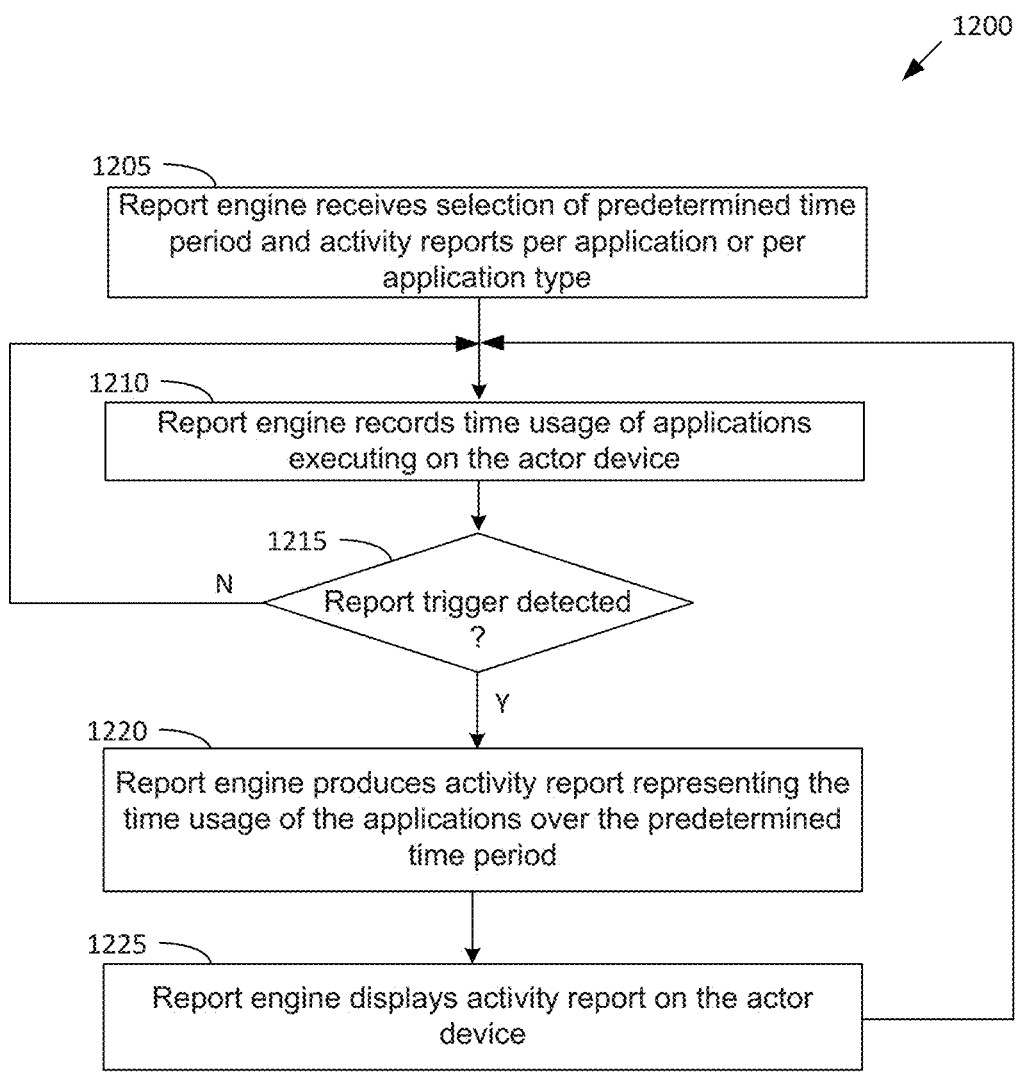
FIG. 12 illustrates a flow diagram of method steps for producing and displaying activity reports on an actor device, according to various embodiments of the present invention.

FIG. 12 illustrates a flow diagram of method steps for producing and displaying activity reports on an actor device, according to various embodiments of the present invention. Although the method steps are described in conjunction with the systems of FIGS. 9-11 persons skilled in the art will understand that any system configured to perform the method steps, in any order, is within the scope of the invention. In some embodiments, the method 1200 may be performed by the report engine 912 executing on the actor device 910.

The method 1200 begins when the report engine 912 receives (at step 1205) a user selection of a predetermined time period of prior usage and a user selection for activity reports 917 per application or per application type. The predetermined time period of prior usage comprises a period of time just prior to a report trigger being detected, wherein an activity report 917 represents the time usage of applications over this predetermined time period. In this way, a user of the actor device 910 can control the amount of application usage history that is shared with others. In other embodiments, the predetermined time period of prior usage is set to a default value (e.g., 5 minutes) and the activity reports 917 are set by default as per application.

The report engine 912 monitors and records (at step 1210) the time usage of various applications 914 executing on the actor device 910. The report engine 912 may determine that an application 914 is "in use" when the application 914 is active (e.g., receiving user inputs or interactions, executing software instructions, and/or processing data) and determine that an application 914 is "not in use" when the application is inactive/idle. Often, multiple applications 914 may be open at the same time as a stack of application windows on the actor device 910. In some embodiments, the report engine 912 may determine that an application 914 is "in use" when the application 914 is the currently selected application 914 (as selected by the user) among the multiple applications. The currently selected application 914 may comprise the top/front application in application stack. In these embodiments, the total time that an application 914 is the currently selected application 914 may comprise the total time usage of the application 914. The report engine 912 may continually monitor and record (at step 1210) the time usage of each application 914 executing on the actor device 910.

The report engine 912 then determines (at step 1215) whether a report trigger has been detected. In some embodiments, the report trigger is based on a physical orientation of the actor device 910 (e.g., in relation to one or more axes of a reference plane). In these embodiments, the report trigger may comprise the orientation sensor 920 detecting that the actor device 910 has been placed in an approximately horizontal orientation such that the actor device 910 is placed on a substantially horizontal plane (e.g., when being placed flat on a table or desk). In other embodiments, the report trigger may comprise the orientation sensor 920 detecting that the actor device 910 has been placed in a different orientation. A report trigger may also comprise a different type of trigger, such as receiving a user input to produce and display the activity report 917. If the report engine 912 determines (at step 1215—No) that a report trigger has not been detected, the method 1200 continues at step 1210. If the report engine 912 determines (at step 1215—Yes) that a report trigger has been detected, the method 1200 continues at step 1220.

The report engine 912 produces (at step 1220) an activity report 917 representing the time usage of the applications 914 over the predetermined time period. For example, if the activity report 917 is per application, the activity report 917 may comprise a plurality of stripes 1010, each stripe corresponding to a particular application 914. Each stripe 1010 may comprise image data comprising a unique icon and/or color associated with the corresponding application 914. The display/pixel size of each stripe 1010 may reflect and be based on the total amount of time the application 914 was in usage over the predetermined time period. The activity report 917 may also contain text data that specifies an application name for the application corresponding to each stripe 1010 and/or text data specifying the predetermined time period. For example, if the activity report 917 is per application type, the activity report 917 may comprise a plurality of stripes 1010, each stripe corresponding to a particular application type. Each stripe 1010 may comprise image data comprising a unique icon and/or color associated with the corresponding application type. The usage time of each application type may be determined by the sum of the usage times of each application associated with the application type (e.g., as specified in an application table 915). The display/pixel size of each stripe 1010 may reflect and be based on the usage time of each application type during the predetermined time period. The activity report 917 may also contain text data that specifies an application type corresponding to each stripe 1010 and/or text data specifying the predetermined time period.

The report engine 912 then displays (at step 1225) the activity report 917 on a display of the actor device 910. The activity report 917 may be displayed as an overlay that is displayed over (on top of) any currently displayed applications on the actor device 910. The report engine 912 may display the activity report 917 for a predetermined period of time before removing the activity report 917 from the display of the actor device 910. The method 1200 then continues at step 1210.

Section III

Various Alternative Embodiments

This section describes various alternative embodiments for sharing information regarding computer activities with others.

A semantic focus embodiment provides an actor device with a microcontroller knob and mounted projector. The microcontroller knob fixed to the actor device controls the focus and clarity of an image that is projected onto a flat surface by the mounted projector. A current application executing on the actor device is projected onto the flat surface, such as a table. The microcontroller knob may be used to vary the level of information detail that is displayed regarding the current application, whereby more information detail is revealed as a user zooms in to an object of interest and the image gradually transitions from a blurred icon to a clear graphical display on the flat surface. The semantic focus embodiment gives explicit control of information detail to the user of the actor device. Content can be blurred at different levels of granularity. For example, at the coarse level (low level of detail), only the current application icon may be displayed. At a fine level (high level of detail), a graphical display of the full application content may be displayed, allowing the actor's interactions with the application to be observed. Since detail in the miniature view may be difficult to make out, a marquee to show the most relevant information in the current application may be displayed. For example, in a text editor application, the current line of text being edited may be displayed. The coarse and fine levels both transition continuously from blurred to focused as the microcontroller knob is rotated. The actor device may comprise a laptop, but similar implementations could be realized on mobile or wearable devices (where these implementations could also use projectors built-into mobile devices). The microcontroller knob operates by sending rotational information from an attached potentiometer to an Arduino Uno microcontroller.

A status band embodiment provides an actor device (such as a smartwatch) and a status band comprising a light strip. Application activities on the actor device may be sent to the status band which displays a particular light pattern indicating the application activity. Thus, the status band may communicates an actor's application activity through different light patterns. If the observer cannot see the actor device, they can instead see the status band's abstraction of what the actor is doing on the actor device. Different application activities may be mapped to different light patterns. For example, a photo capture activity may be mapped to two quick bright white flashes with all lights, a video recording activity may be mapped to two slow red flashes until recording is stopped, an audio record activity may be mapped to two slow blue flashes until recording is stopped, and so forth. Thus, while the band provides an abstract representation, the information conveyed can be presented with fine granularity. The status band may comprise an RGB LED light strip that is worn on the actor's wrist as a wrist-worn bracelet. It may be made from an off-the-shelf, addressable, RGB LED strip, which is attached to a metal watch clasp and controlled with an Arduino Lilypad.

An iconic jewelry embodiment provides an actor device and jewelry comprising muscle memory wire that is associated with a particular application executing on the actor device. Actor interaction with the particular application executing on the actor device causes a current in the jewelry which causes the shape of the jewelry to change, thus conveying to observers the actor's interaction with the particular application. For example, when the actor interacts with an application, the associated jewelry may moves from a relaxed to a contracted state. The iconic jewelry embodiment communicates application activity though the modality of motion. Each item of jewelry may be color-coded to represent an individual application, with a custom laser-cut acrylic icon attached as a pendant. For example, a necklace jewelry may be associated with an email application, a first earring jewelry associated with a game application, and a second earring jewelry associated with a social network application. Each jewelry piece may be constructed from a strand of Muscle Wire (nitinol), which remembers a specific shape when annealed at a high temperature. The wire takes a relaxed form at room temperature, but reverts to its remembered shape when reheated to roughly 100° C. A 12V electrical circuit may be activated through transistors and an Arduino Uno board. The wires are annealed into helical shapes, causing them to contract when a current is applied. Embroidery thread wrapped tightly around the wire insulates the wire, making it comfortably wearable. A long burst of current may be applied when an application is initially opened, causing the jewelry to contract quickly and noticeably. The jewelry continues to move through more gentle cycles as long as there is ongoing activity in the associated application.

A fog hat embodiment provides an actor device and a fog-generating device that is worn by the actor. Application activity on the actor device may be displayed through a fog above the actor through the fog device mounted on the actor. For example, application icons and application content may be projected onto a screen of mist above the actor's head via the fog device. The content of the display can be further obfuscated by turbulence from a fan. The fog hat embodiment incorporates multiple levels of information detail using a marquee feature for sharing important information. The granularity of information detail is controlled by the actor's selected level. At the coarse level (low level of detail), only the icon of the current application is shown. At the fine level (high level of detail), the display shows more information including a miniature page view and a marquee. This implementation consists of an ultrasonic humidifier, a length of flexible PVC pipe and a custom 3D printed manifold for directing the mist stream. The image is back-projected from a Microvision SHOWWX+ laser projector (5.1×22.9×17.8 cm, 776 g). Affixed to the Fog Manifold is a 5V fan, which can create turbulence to further obfuscate the mist display. An Arduino Leonardo microcontroller operates the fan and a relay switch that turns the mist on or off. The apparatus is connected to the actor device and carried in a small backpack. Advances in miniaturization will eventually allow a similar device to be built into a more amenable form factor. Applications may use different layouts to leverage the fog manifold's inherent turbulence, applications with low privacy needs, such as the web or game apps, place the marquee at the smooth region at the display's bottom, where text and images remain clearly legible. Applications that require greater privacy, such as the email application, place the marquee higher, in the more turbulent region. In this case typing activity is still conveyed to the observer, but the contents are obscured. Decreasing the filter setting to minimal or moderate activates the small fan, which increases privacy further by creating additional turbulence.

In sum, an activity notification environment is provided for enabling sharing of activity notifications regarding application usage on an actor device. An activity notification describing application activity on an actor device may be sent, via a wireless connection, to an observer device which displays the activity notification. Activity notifications may be configured to provide different granularity levels of information detail regarding the application activities on the actor device. For example, activity notifications may be configured to only provide a low level of detail (such as the opening and closing of applications) or a higher level of details (such as specific functions that are being performed on the applications, e.g., sending an email, opening a webpage, etc.). In some embodiments, the activity notifications provide a level of activity detail based on a granularity level selection received from the actor. In these embodiments, the actor explicitly selects the level of information to be shared with observer devices around the actor. In other embodiments, the activity notifications provide a level of activity detail based on a physical distance (proximity) between the actor/actor device and the observer/observer device.

At least one advantage of the disclosed technique is that it provides information regarding application activities of an actor device to surrounding observer devices.

In sum, an actor device is provided for producing and displaying activity reports representing the history of application usage/activity on the actor device. An activity report may provide a graphical representation of the application usage/activity on the actor device for a predetermined time period of prior usage (e.g., the last 10 minutes of application activity). The graphical representation may comprise a plurality of stripes, each stripe representing a particular application or application type. The size of each stripe may represent and correspond to the total amount of time the application or application type was in usage during the predetermined time period. For example, the activity report may be triggered to by displayed on the actor device when the actor device is placed flat on a table, or when it receives a user input to display the activity report.

At least one advantage of the disclosed technique is that it provides information regarding history of application usage on an actor device to those around the actor device.

Figure 13:
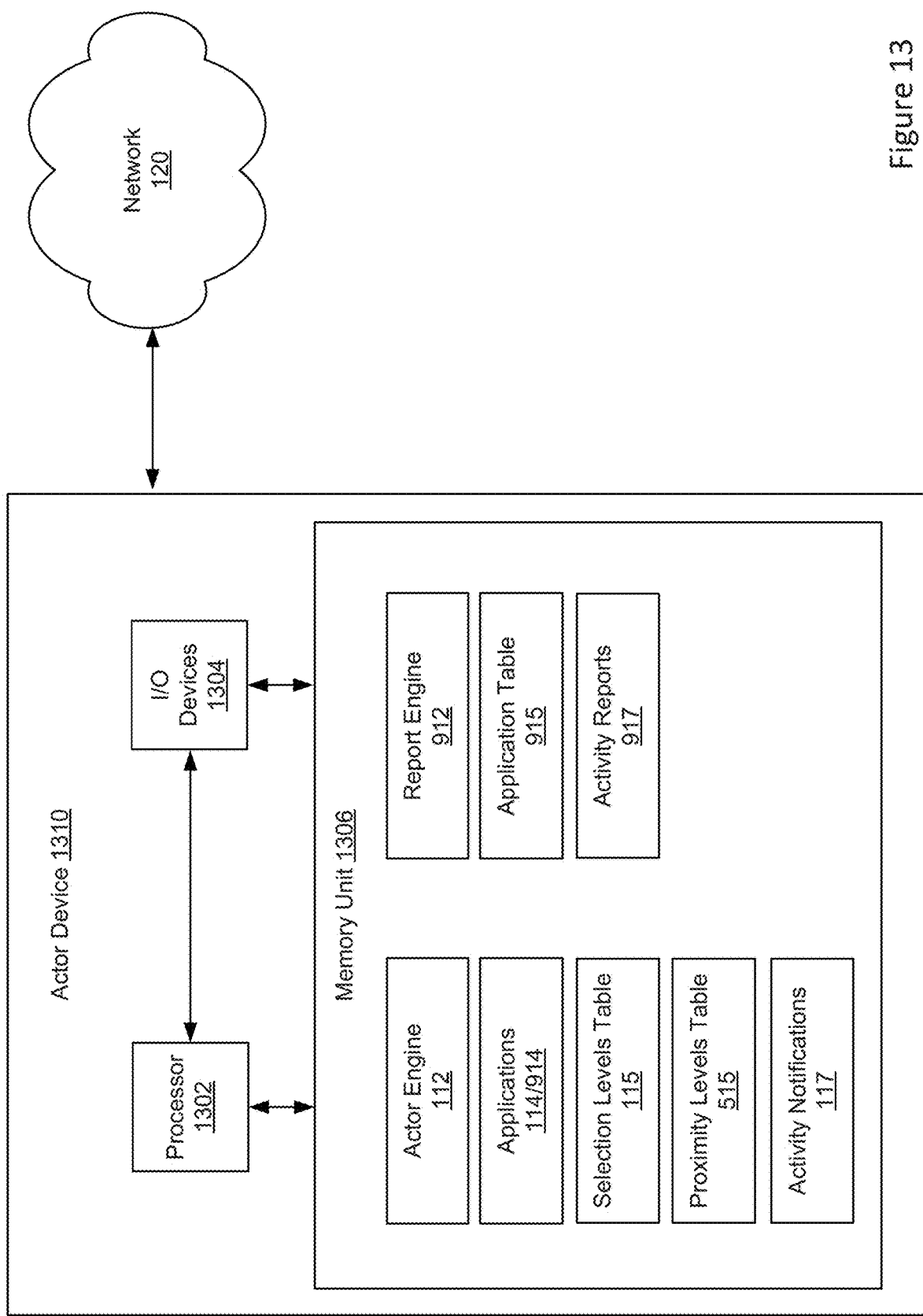
FIG. 13 illustrates an exemplary actor device, according to various embodiments of the present invention.

FIG. 13 illustrates an exemplary actor device, according to various embodiments of the present invention. The example actor device 1310 may comprise actor device 110 of FIGS. 1 and 5 and actor device 910 of FIG. 9. The actor device 1310 may comprise a mobile or wearable computing device, such as a smartphone, smartwatch, smartglasses, laptop, tablet, and the like. In general, however, the actor device 1310 may each comprise any computing device configured to perform the embodiments described herein. The actor device 1310 comprises at least one processor 1302, input/output (I/O) devices 1304, and a memory unit 1306, coupled together. The actor device 1310 is coupled to a network 120 via a network interface (not shown). The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

Processor 1302 may be a central processor (CPU), a graphics processor (GPU), an application-specific integrated circuit (ASIC), a field-programmable gate array (FPGA), and so forth. Processor 1302 may also be a combination of different processors, such as a CPU configured to operate in conjunction with a GPU, or many CPUs configured to work together through cloud computing. In general, processor 1302 may be any technically feasible processing device or hardware unit capable of processing data and executing software applications and program code. The processor 1302 executes the software and performs the functions and operations set forth in the embodiments described herein.

Memory 1306 is configured to store software application (s) and data. Instructions from the software constructs within the memory 1306 are executed by processors 1302 to enable the inventive operations and functions described herein. In various embodiments, the memory 1306 is configured to store an actor engine 112, applications 114/914, selection levels table 115, proximity levels table 515, activity notifications 117, report engine 912, application table 915, and activity reports 917. Memory 1306 may include a hard disk, a random access memory (RAM) module, a flash memory unit, or any other type of memory unit or combination thereof. Processor 1302 and I/O devices 1304 are configured to read data from and write data to memory 1306.

I/O devices 1304 are also coupled to memory 1306 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth. In particular, the I/O devices may further include a display monitor that displays the actor engine 112, applications 114/914, report engine 912, and activity reports 917. In some embodiments, the I/O devices 1304 also includes an input camera/video capture device, viewing component 550, and an orientation sensor device 920. The viewing component 550 enables simultaneous viewing of persons and objects and displaying of activity notifications 117. The viewing component 550 may comprise a combination of hardware components and software components for providing the simultaneous viewing and displaying functions. For example, the observer device 130 may comprise a smartphone having a viewing component 550 comprising camera or video components (e.g., lens and camera/video software) for viewing the actor and a display for displaying the person and the activity notifications 117. As another example, the viewing component 550 may comprise smartglasses, wherein the glass lenses enable viewing of the person and displaying of the activity notifications 117. The orientation sensor device 920 detects the physical orientation of the actor device 1310 (e.g., in relation to one or more axes of a reference plane). Examples of the orientation sensor device 920 include an accelerometer and tilt sensor.

Figure 14:
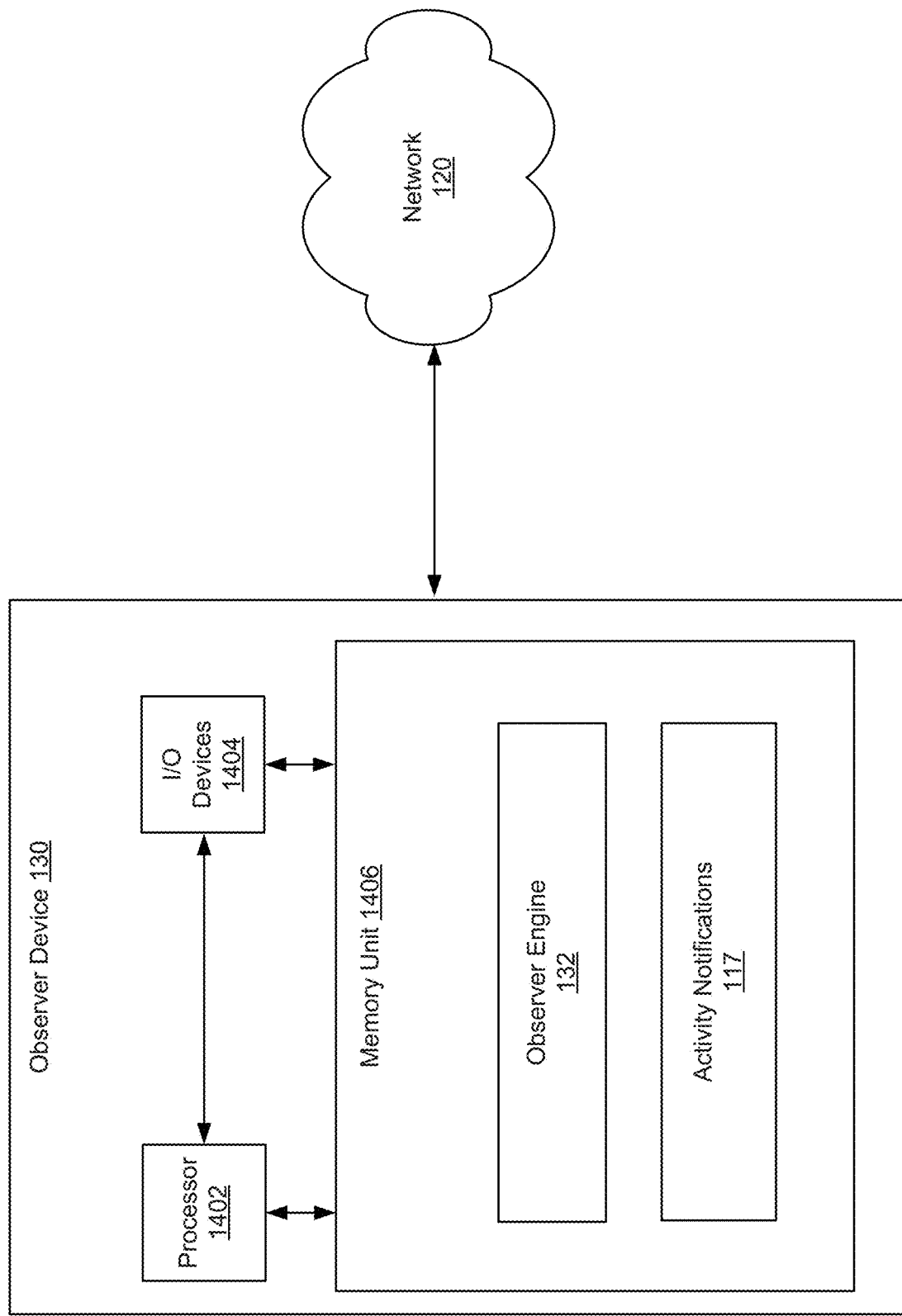
FIG. 14 illustrates an exemplary observer device, according to various embodiments of the present invention.

FIG. 14 illustrates an exemplary observer device, according to various embodiments of the present invention. The observer device 130 may comprise a mobile or wearable computing device, such as a smartphone, smartwatch, smartglasses, laptop, tablet, and the like. In general, however, the observer device 130 may comprise any computing device configured to perform the embodiments described herein. The observer device 130 comprises at least one processor 1402, input/output (I/O) devices 1404, and a memory unit 1406, coupled together. The observer device 130 is also coupled to a network 120 via a network interface (not shown).

Processor 1402 may be a central processor (CPU), a graphics processor (GPU), an application-specific integrated circuit (ASIC), a field-programmable gate array (FPGA), and so forth. Processor 1402 may also be a combination of different processors, such as a CPU configured to operate in conjunction with a GPU, or many CPUs configured to work together through cloud computing. In general, processor 1402 may be any technically feasible processing device or hardware unit capable of processing data and executing software applications and program code. The processor 1402 executes the software and performs the functions and operations set forth in the embodiments described herein.

Memory 1406 is configured to store software application(s) and data. Instructions from the software constructs within the memory 1406 are executed by processors 1402 to enable the inventive operations and functions described herein. In various embodiments, the memory 1406 is configured to store an observer engine 132 and activity notifications 117. Memory 1406 may include a hard disk, a random access memory (RAM) module, a flash memory unit, or any other type of memory unit or combination thereof. Processor 1402 and I/O devices 1404 are configured to read data from and write data to memory 1406.

I/O devices 1404 are also coupled to memory 1406 and may include devices capable of receiving input from an end-user, such as a keyboard, a mouse, a trackball, and so forth, as well as devices capable of providing output to an end-user, such as a display, speaker, and so forth. Additionally, I/O devices may include devices capable of both receiving input and providing output, such as a touchscreen, a universal serial bus (USB) port, and so forth. In particular, the I/O devices may further include a display monitor that displays the observer engine 132 and activity notifications 117. In some embodiments, the I/O devices 1304 also includes an input camera/video capture device, viewing component 550, and an orientation sensor device 920. The viewing component 550 and orientation sensor device 920 are discussed above in relation to FIG. 13 and are not discussed in detail here.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for communicating information related to computing device activity, the method comprising:
   determining a first level of activity from a plurality of levels of activity, wherein each level of activity in the plurality of levels of activity corresponds to a different set of user activities, and each user activity in the different set of user activities comprises a user interaction with an application executing on an actor device, wherein determining the first level of activity comprises receiving a distance value comprising an approximate distance between the actor device and an observer device, and wherein the distance value determines the first level of activity;
   detecting, at the actor device, a first user activity associated with a first application executing on the actor device;
   in response to determining that the first user activity satisfies the first level of activity, producing, at the actor device, an activity notification that includes information related to the first user activity; and
   transmitting the activity notification to the observer device for display.

2. The computer-implemented method of claim 1, wherein the activity notification comprises text data describing the user activity.

3. The computer-implemented method of claim 1, wherein the activity notification comprises text data comprising at least one of an actor name, an application activity name, an application name, and an application type.

4. The computer-implemented method of claim 1, wherein the activity notification further comprises image data comprising an icon or color representing the first application.

5. The computer-implemented method of claim 1, wherein the activity notification is transmitted to the observer device via a wireless connection.

6. The computer-implemented method of claim 1, wherein the actor device comprises a mobile device or wearable device.

7. One or more non-transitory computer-readable media storing program instructions that, when executed by one or more processors, cause the one or more processors to communicate information related to computing device activity by performing the steps of:
   determining a first level of activity from a plurality of levels of activity, wherein each level of activity in the plurality of levels of activity corresponds to a different set of user activities, and each user activity in the different set of user activities comprises a user interaction with an application executing on an actor device, wherein determining the first level of activity comprises receiving a distance value comprising an approximate distance between the actor device and an observer device, and wherein the distance value determines the first level of activity;
   detecting, at the actor device, a first user activity associated with a first application executing on the actor device;
   in response to determining that the first user activity satisfies the first level of activity, producing, at the actor device, an activity notification that includes information related to the first user activity; and
   transmitting the activity notification to the observer device for display.

8. The one or more non-transitory computer-readable media of claim 7, wherein the activity notification comprises text data comprising at least one of an actor name, an application activity name, an application name, and an application type.

9. The one or more non-transitory computer-readable media of claim 7, wherein the activity notification further comprises image data comprising an icon or color representing the first application.

10. The one or more non-transitory computer-readable media of claim 7, further comprising:
   storing, at the actor device, an activity table that includes the plurality of levels of activity, each level of activity mapping to a different set of user activities, wherein the first level of activity that maps to a first set of user activities in the activity table; and
   producing the activity notification only upon determining that the first user activity is included in the first set of user activities.

11. The one or more non-transitory computer-readable media of claim 7, wherein the activity notification comprises at least one interactive item, further comprising receiving a backchannel notification from the observer device indicating that the at least one interactive item was selected.

12. The one or more non-transitory computer-readable media of claim 7, wherein the observer device includes a viewing component for viewing a user of the actor device and displaying the activity notification.

13. The one or more non-transitory computer-readable media of claim 12, wherein the viewing component displays the activity notification as an overlay proximate to the user of the actor device.

14. A system configured for communicating information related to computing device activity, comprising:
   an actor device comprising:
      a memory that includes an actor engine; and
      a processor that is coupled to the memory and, upon executing the actor engine, is configured to:
         determine a first level of activity from a plurality of levels of activity, wherein each level of activity in the plurality of levels of activity corresponds to a different set of user activities, and each user activity in the different set of user activities comprises user interaction with an application executing on an actor device, wherein determining the first level of activity comprises receiving a distance value comprising an approximate distance between the actor device and an observer device, and wherein the distance value determines the first level of activity;

detect a first user activity associated with a first application executing on the actor device;

in response to determining that the first user activity satisfies the first level of activity, produce an activity notification that includes information related to the first user activity; and transmit the activity notification to the observer device for display.

15. The system of claim 14, further comprising:

an observer device comprising:

an observer memory that includes an observer engine; and an observer processor that is coupled to the observer memory and, upon executing the observer engine, is configured to:

receive the activity notification via a wireless connection; and display the activity notification.

16. The computer-implemented method of claim 1, wherein the activity notification comprises at least one interactive item comprising at least one of a hyperlink and an interactive webpage.

17. The computer-implemented method of claim 1, wherein the activity notification comprises at least one interactive item comprising a weblink to a corresponding webpage, the method further comprising:

receiving, at the observer device, a user selection of the weblink; and displaying, at the observer device, the corresponding webpage.

18. The computer-implemented method of claim 1, wherein each level of activity in the plurality of levels of activity indicates a different granularity level of user activities to be shared in the activity notification.

19. The computer-implemented method of claim 1, wherein:

the first level of activity corresponds to a first set of user activities; and determining that the first user activity satisfies the first level of activity comprises determining that the first set of user activities includes the first user activity.

* * * * *

UNITED STATES PATENT AND TRADEMARK OFFICE
CERTIFICATE OF CORRECTION

| | | |
|---|---|---|
| PATENT NO. | : 11,190,560 B2 | |
| APPLICATION NO. | : 15/183549 | |
| DATED | : November 30, 2021 | |
| INVENTOR(S) | : Tovi Grossman et al. | |

It is certified that error appears in the above-identified patent and that said Letters Patent is hereby corrected as shown below:

On the Title Page

Item (72) Inventors, please delete "Barret Ens" and insert --Barrett Ens--;

In the Claims

Column 22, Claim 10, Line 35, please delete "that";

Column 22, Claim 14, Line 63, please insert --a-- after comprises.

Signed and Sealed this
Twentieth Day of September, 2022

*Katherine Kelly Vidal*

Katherine Kelly Vidal
*Director of the United States Patent and Trademark Office*